(12) United States Patent
Zivkovic et al.

(10) Patent No.: US 12,314,217 B2
(45) Date of Patent: May 27, 2025

(54) HYBRID HARDWARE ACCELERATOR AND PROGRAMMABLE ARRAY ARCHITECTURE

(71) Applicant: Intel Corporation, Santa Clara, CA (US)

(72) Inventors: Zoran Zivkovic, Hertogenbosch (NL); Kameran Azadet, San Ramon, CA (US); Kannan Rajamani, Basking Ridge, NJ (US); Thomas Smith, Colmar, PA (US)

(73) Assignee: Intel Corporation, Santa Clara, CA (US)

( * ) Notice: Subject to any disclaimer, the term of this patent is extended or adjusted under 35 U.S.C. 154(b) by 640 days.

(21) Appl. No.: 17/560,637

(22) Filed: Dec. 23, 2021

(65) Prior Publication Data

US 2023/0205730 A1 Jun. 29, 2023

(51) Int. Cl.
*G06F 15/80* (2006.01)
*G06F 17/11* (2006.01)

(52) U.S. Cl.
CPC .......... *G06F 15/8092* (2013.01); *G06F 17/11* (2013.01)

(58) Field of Classification Search
None
See application file for complete search history.

(56) References Cited

U.S. PATENT DOCUMENTS

| | | | | |
|---|---|---|---|---|
| 2012/0249888 | A1* | 10/2012 | Naik | H04N 5/455 348/E5.113 |
| 2013/0022157 | A1* | 1/2013 | Hollevoet | H04B 1/0003 375/343 |
| 2014/0372728 | A1* | 12/2014 | Nilsson | G06F 9/30036 712/7 |
| 2020/0364178 | A1* | 11/2020 | Kumar | G06F 15/8092 |
| 2020/0409701 | A1* | 12/2020 | Chen | G06F 9/30003 |
| 2021/0287429 | A1* | 9/2021 | Vaidyanathan | G06T 15/08 |

OTHER PUBLICATIONS

Vinitha, C.S. et al., A Efficient LUT Design on FPGA for Memory-Based Multiplication, 2019, IJEEE. 17 pages. (Year: 2019).*
Xie, Xinfeng et al., SpaceA: Sparce Matrix Vector Multiplication on processing-in-Memory Multiplication on Processing-in-Memory Accelerator, 2021, IEEE, pp. 570-583. (Year: 2021).*

(Continued)

*Primary Examiner* — Eric Coleman
(74) *Attorney, Agent, or Firm* — Banner & Witcoff Ltd.

(57) ABSTRACT

Techniques are disclosed for the use of a hybrid architecture that combines a programmable processing array and a hardware accelerator. The hybrid architecture dedicates the most computationally intensive blocks to the hardware accelerator, while maintaining flexibility for additional computations to be performed by the programmable processing array. An interface is also described for coupling the processing array to the hardware accelerator, which achieves a division of functionality and connects the programmable processing array components to the hardware accelerator components without sacrificing flexibility. This results in a balance between power/area and flexibility.

21 Claims, 11 Drawing Sheets

(56) References Cited

OTHER PUBLICATIONS

Kachris, Christoforos, et al., An FPGA-based Integrated MapReduce Accelerator Platform, 2017, Springer, J Sign Process Syst. pp. 357-369. (Year: 2017).*

Gu, Peng, et al., DLUX: A LUT-Based Near-Bank Accelerator for Data Center Deep Learning Training Workloads, Aug. 2021, IEEE, Transactions on computer-aided design of integrated circuits and systems, pp. 1586-1599. (Year: 2021).*

Yu, Jason, et al., Vector Processing as a Soft Processor Accelerator, 2009, ACM, pp. 12:1-12:34. (Year: 2009).*

M. Moonat, et al., "Leveraging the On-Chip FIR and IIR Hardware Accelerators on a Digital Signal Processor", URL: https://www.analog.com/media/en/analog-dialogue/volume-54/number-2/1everaging-the-on-chip-fir-and-iir-hardware-accelerators.pdf, 4 pgs., Apr. 15, 2020.

H. Ryu, et al., "Enhancing Performance of Large-Scale Electronic Structure Calculations with Many-Core Computing", IEEE International Conference on Cluster Computing, 2 pgs., Sep. 12, 2016.

Anonymous, "SHARC+ Dual-Core DSP with ARM Cotrex-A5", URL: https://www.analog.com/media/en/technical-documentation/data-sheets/adsp-sc5'70-571-572-573-adsp-21571-573.pdf, 1 pg., Dec. 31, 2018.

May 4, 2023 (EP) Search Report—App. 22214645.8.

\* cited by examiner

HYBRID HARDWARE ACCELERATOR AND PROGRAMMABLE ARRAY ARCHITECTURE

TECHNICAL FIELD

The disclosure described herein generally relates to techniques for interfacing a processing array architecture with a hardware accelerator architecture to provide a hybrid solution that realizes the benefits of both architectures.

BACKGROUND

In many applications such as digital front end (DFE) radios, there is a need for fast computations to ensure that the digital data is transmitted and received efficiently. This may include the calculation of digital pre-distortion (DPD) coefficients or other terms used for digital communications, which require fast and accurate processing as data is transmitted and/or received as part of a data stream.

Programmable solutions for DFE radios provide flexibility to adapt the manner in which such computations are performed, but are inefficient in terms of cost and power. For instance, hardwired application specific integrated circuit (ASIC) solutions may be implemented in current DFE radio products, as ASICs are power and cost efficient, but lack the flexibility provided by programmable processing arrays. Programmable processing arrays, on the other hand, although flexible in their implementation, are computationally intensive and thus inefficient in terms of power, and are less cost-effective. Therefore, both hardwired and programmable solutions have various drawbacks.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the implementations as discussed herein.

The present disclosure will be described with reference to the accompanying drawings. The drawing in which an element first appears is typically indicated by the leftmost digit(s) in the corresponding reference number.

DETAILED DESCRIPTION

Figure 1:
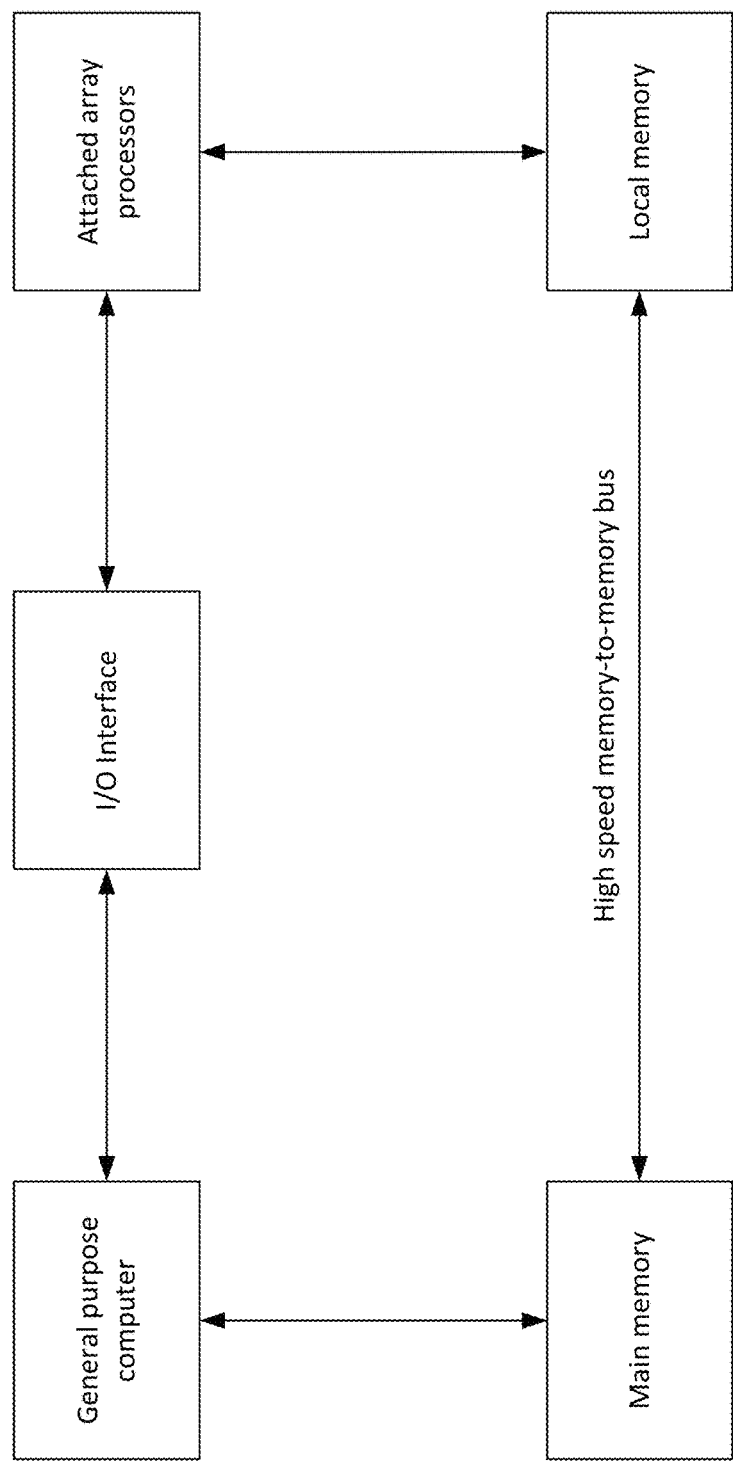
FIG. 1 illustrates an example of a conventional vector processor architecture.

In the following description, numerous specific details are set forth in order to provide a thorough understanding of the present disclosure. However, it will be apparent to those skilled in the art that the implementations of the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

Programmable Processing Array Operation

The programmable processing arrays as discussed in further detail herein may be implemented as vector processors (also referred to as array processors), which are a central processing unit (CPU) that implements an instruction set containing instructions that operate on one-dimensional arrays of data referred to as "vectors." This is in contrast to scalar processors having instructions that operate on single data items. Vector processors can greatly improve performance on certain workloads, notably numerical simulation and similar tasks, by utilizing a number of execution units that independently execute specific functions on incoming data streams to achieve a processing flow.

Generally speaking, conventional CPUs manipulate one or two pieces of data at a time. For instance, conventional CPUs may receive an instruction that essentially says "add A to B and put the result in C," with 'C' being an address in memory. Typically the data is rarely sent in raw form, and is instead "pointed to" via passing an address to a memory location that holds the actual data. Decoding this address and retrieving the data from that particular memory location takes some time, during which a conventional CPU sits idle waiting for the requested data to be retrieved. As CPU speeds have increased, this memory latency has historically become a large impediment to performance.

Thus, to reduce the amount of time consumed by these steps, most modern CPUs use a technique known as instruction pipelining in which the instructions sequentially pass through several sub-units. The first sub-unit reads and decodes the address, the next sub-unit "fetches" the values at those addresses, while the next sub-unit performs the actual mathematical operations. Vector processors take this concept even further. For instance, instead of pipelining just the instructions, vector processors also pipeline the data itself. For example, a vector processor may be fed instructions that indicate not to merely add A to B, but to add all numbers within a specified range of address locations in memory to all of the numbers at another set of address locations in memory. Thus, instead of constantly decoding the instructions and fetching the data needed to complete each one, a vector processor may read a single instruction from memory. This initial instruction is defined in a manner such that the instruction itself indicates that the instruction will be repeatedly executed on another item of data, at an address one increment larger than the last. This allows for significant savings in decoding time.

Figure 2:
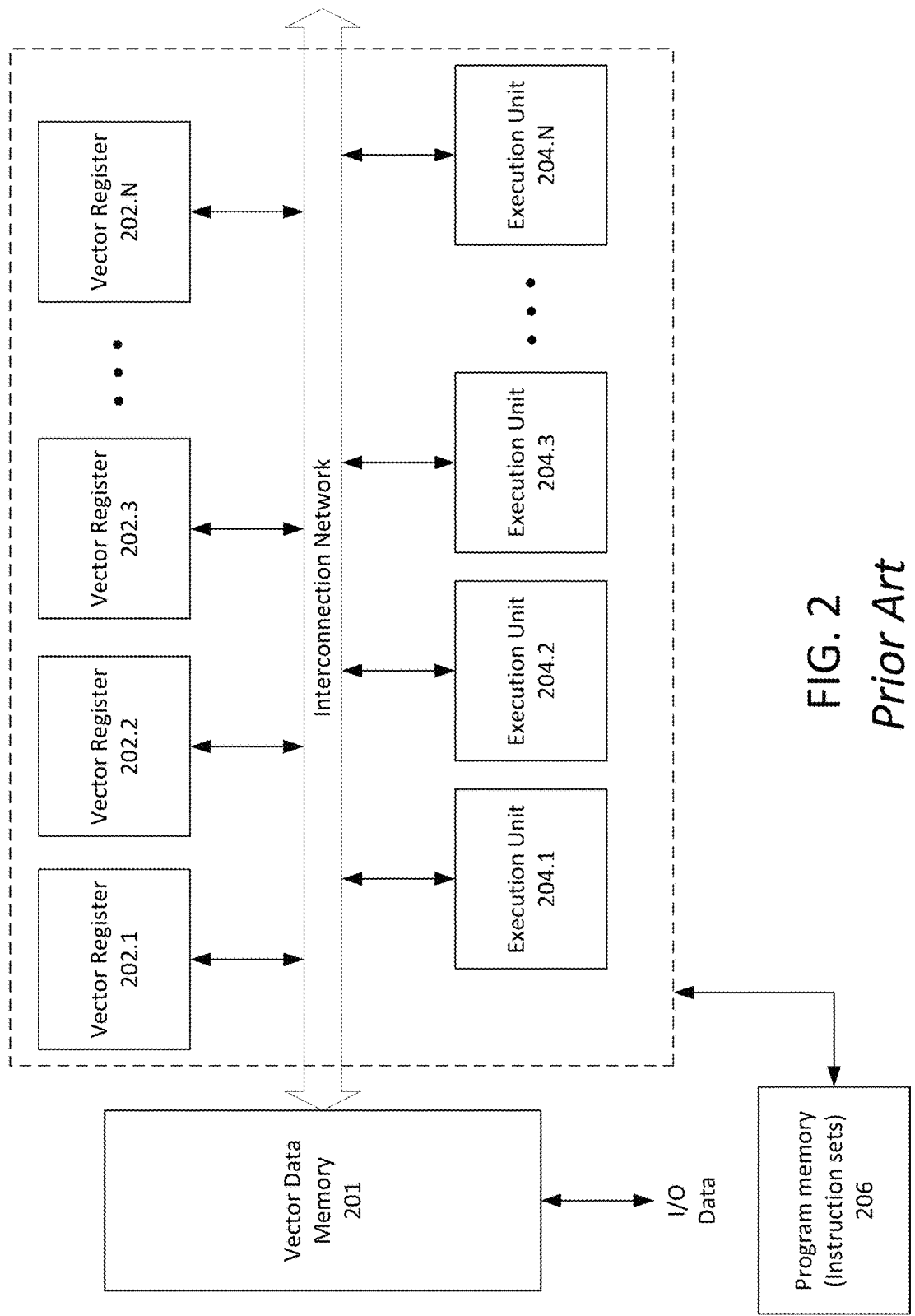
FIG. 2 illustrates another example of a conventional vector processor architecture.

Vector processors may be implemented in accordance with various architectures, and the various vector processor architectures as discussed throughout the disclosure as further described herein may be implemented in accordance with any of these architectures or combinations of these architectures, as well as alternative processing array architectures that are different that vector processors. FIGS. 1 and 2 provide two different implementations of a vector processor architecture. FIG. 1 illustrates an attached vector processor, which is attached to a general purpose computer for the purpose of enhancing and improving the performance of that computer in numerical computational tasks. The attached vector processor achieves high performance by means of parallel processing with multiple functional units, which may be alternatively referred to herein as execution units or processing units.

FIG. 2, on the other hand, shows an example of a single instruction stream, multiple data streams (SIMD) vector processor. The vector processor architecture 200 as shown in FIG. 2 may have an architecture consisting of one or more execution units. Each execution unit is capable of executing one instruction. Each instruction can be a control, load/store, scalar or a vector instruction. Therefore, a processor with N execution units 204.1-204.N as shown in FIG. 2 can issue as many as N instructions every clock cycle. The execution units 204.1-204.N function under the control of a common control unit (such as processing circuitry), thus providing a single instruction stream to control each of the execution units 204.1-204.N. The I/O data as shown in FIG. 2 is typically identified with data communicated between the vector processor 200 and another data source or processor (which may be the common control unit or another processor) depending upon the particular application. The vector data memory 201 thus stores data received as input to be processed by the execution units 204.1-204.N, and data that is output or read from the vector data memory 201 after the data is processed. The vector processor architecture 200 as shown in FIG. 2 is an example of a load-store architecture used by vector processors, which is an instruction set architecture that divides instructions into two categories: memory access (loading and storing data between the vector data memory 201 and the vector registers 202.1-202.N) and the vector processing operations performed by the execution units 204.1-204.N using the data retrieved from and the results stored to the vector registers 202.1-202.N.

Thus, the load-store instruction architecture facilitates data stored in the vector data memory 201 that is to be processed to be loaded into the vector registers 202.1-202.N using load operations, transferred to the execution units 204.1-204.N, processed, written back to the vector registers 202.1-202.N, and then written back to the vector data memory 201 using store operations. The location (address) of the data and the type of processing operation to be performed by each execution unit 204.1-204.N is part of an instruction stored as part of the instruction set in the program memory 206. The movement of data between these various components may be scheduled in accordance with a decoder that accesses the instructions sets from the program memory, which is not shown in further detail in FIG. 2 for purposes of brevity. The interconnection network, which supports the transfer of data amongst the various components of the vector processor architecture 200 as shown in FIG. 2, is generally implemented as a collection of data buses and may be shared among a set of different components, ports, etc. In this way, several execution units 204.1-204.N may write to a single vector register 202, and the data loaded into several vector registers 202.1-202.N may be read by and processed by several of the execution units 204.1-204.N.

The use of instruction sets in accordance with the vector processor architecture 200 is generally known, and therefore an additional description of this operation is not provided for purposes of brevity. Regardless of the particular implementation, vector processors can greatly improve performance on certain workloads but have various drawbacks. For instance, and as noted above, vector processors may form part of what is referred to herein as a programmable array or a programmable vector array, which are traditionally computationally intensive, expensive, and suffer from power inefficiencies. As a result, such programmable vector engines may not be ideal for mobile or base station applications that implement DFE architectures. Furthermore, and as noted above, hardwired ASIC solutions are fast and efficient in terms of power consumption, but lack the flexibility provided by the programmable nature of the vector arrays.

Digital Pre-Distortion (DPD) Calculations

It is noted that current products such as DFEs typically implement either programmable or hardware-based solutions, each resulting in the tradeoffs as noted above. For instance, and as shown in FIG. 3A, DFEs may implement a hardwired ASIC to perform DFE functions such as DPD calculations. As further discussed below, DPD calculations are typically performed by sampling data at specific locations within an RF chain identified with the RF block, such as at the antenna. The sampled measurements are then used as feedback to calculate DPD coefficients that are applied to the data stream prior to transmission to compensate for various non-linearities, memory effects, etc., of the RF chain components. Thus, a hardwired ASIC in such implementations represents a customized and optimized hardware solution that performs specific types of calculations, such as DPD calculations, in accordance with the specific set of operating parameters of the DFE. As a result, although such hardware ASIC solutions are fast and efficient in terms of power, such architectures lack flexibility and typically cannot be adapted to other DFEs or other applications.

Figure 3B:
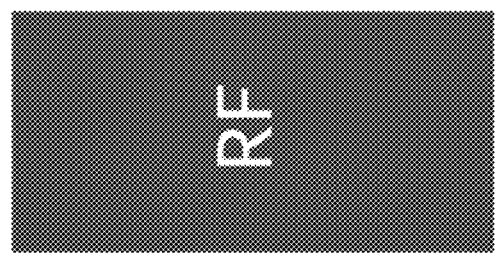
FIG. 3B illustrates programmable processing arrays for performing digital front end (DFE) functions.
Figure 3B:
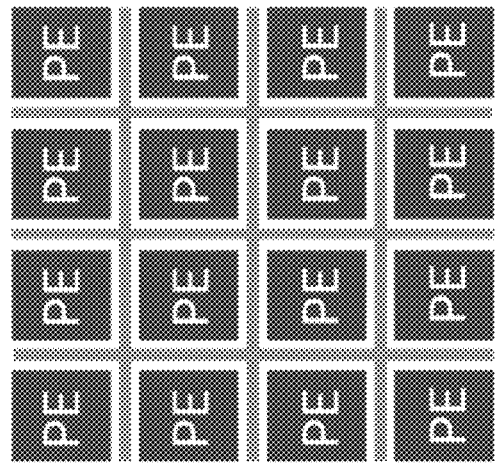
Figure 3A:
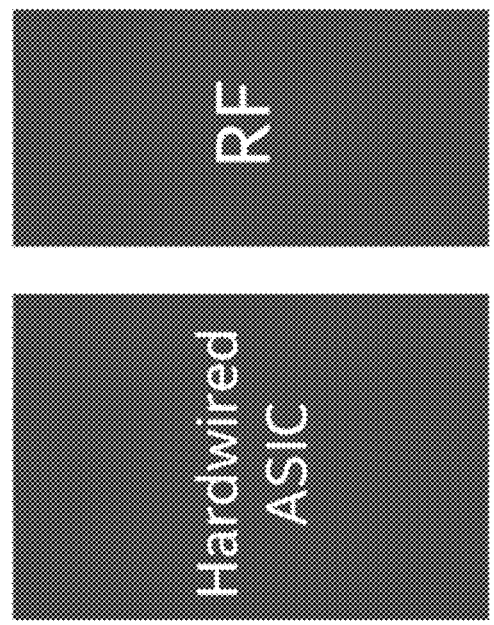
FIG. 3A illustrates a conventional hardwired solution for performing DFE functions.

Thus, other solutions for performing DFE functions include the use of programmable arrays as shown in FIG. 3B. Such solutions are typically field programmable gate arrays (FPGAs) or a mesh of processors with an interconnection connecting the programmable processing elements (PEs), which provides some flexibility to adapt how the DFE functions are performed across different products. Thus, such solutions also function to sample data at specific locations within an RF chain, but alternatively implement the use of the PEs to perform the DPD calculations. As a result, such solutions provide flexibility to adapt the manner in which DPD calculations are performed, but do so using increased power and added cost compared to hardwired ASIC solutions.

Furthermore, to the extent that hybrid solutions are implemented, FPGA suppliers have elected to implement some of the processing components as hardware blocks. However, such products still fail to implement a hybrid solution in which the programmable components are realized as a programmable processing array. Moreover, such hybrid solutions are still not very power efficient, as these are based on FPGA solutions.

The disclosure as further described herein addresses these issues by implementing a hybrid approach that combines the benefits of a programmable processing array and a hard-wired solution. To do so, the disclosure is directed to a hybrid architecture that couples a processing array to a hardware accelerator. This architecture dedicates the most computationally-intensive blocks to the hardware accelerator, which may include the DPD computation blocks in the context of a DFE, although the disclosure is not limited to this particular implementation as further noted herein. The disclosure describes an interface for coupling a processing array to a hardware accelerator, which achieves a division of functionality and connects the programmable processing array components to the accelerated hardware components without sacrificing flexibility. This results in a splitting of functionality and accompanying defined connections and interfaces to provide a balance between power/area and flexibility. This balance may represent an optimum balance, a balance in accordance with as predetermined, calibrated, and/or measured power/area and flexibility balance, etc.

As further described below, the disclosure implements such a hybrid solution by implementing a hardware accelerator for the most computationally-intensive blocks. For an implementation as part of a DFE, this may include the DPD computations. Thus, the hardware accelerator in accordance with such implementations is configured to compute a set of common lookup table (LUT) based memory terms, which may be used in accordance with any suitable number and/or type of DPD algorithm implementations. As further discussed below, the hardware accelerator is configured efficiently by having limited flexibility to select the number and type of terms up to a maximum number, which is 48 terms in the following illustrative scenario. Thus, and as further described below, the hardware accelerator may implement sets of LUTs that store entries identified with the terms of the particular function that is to be evaluated to output the hard-computed terms. The LUTs as described herein may have any suitable size and be identified with any suitable type of memory structure. The entries of the LUTs may thus represent evaluated values of a corresponding function, which may be represented in accordance with the terms of a function as denoted in the Equations 1 and 2 below. The entries of the LUTs used in this manner, i.e. the LUT based memory terms, are then multiplied by a set of data samples or any suitable function (such as a polynomial function). This process may then be repeated for any suitable number of delayed signal versions of the input signal, with the results being summed together as indicated in Equation 2 below to generate the hard-computed terms.

The DPD function may represent any suitable function that relates measured signal samples in the RF chain to provide DPD coefficients as a function of those measured samples. For typical DFE applications, the DPD function represents a non-linear function of a complex signal represented as x. The DPD function typically depends on the history of the signal that is needed to model the memory effects of the power amplifier identified with the DFE RF chain. To provide further clarity, let $x_{-d}$ denote a complex value at a measured sample d from the past. A common model from literature is a polynomial function written in the form of Eqn. 1 below as follows:

$$\sum_p \sum_{d_1} \sum_{d_2} \cdots \sum_{d_p} \theta_{d_1, d_2, \ldots, d_p} x_{-d_1} x_{-d_2} \cdots x_{d_p} \qquad \text{Eqn. 1}$$

where the signal values from different parts of the history defined by d1, ..., $d_p$ are combined together and multiplied by a corresponding parameter $\theta_{d_1, \ldots, d_p}$. The delays d1, ..., $d_p$ and the corresponding parameters are typically determined for each power amplifier in the RF chain implementing the DFE via an optimization process. The variable p represents an order of the polynomial function, and determines the number of various delays d1 ... dp and terms x-d1.

Another common DPD function implementation is to use lookup table (LUT) entries based on the signal magnitude to model the non linearity, and then model additional non-linearities using polynomial terms. Thus, if there are to be a maximum of K different terms, with K in the illustrative scenario used in Eqn. 2 below and referenced throughout the disclosure being 48, although the disclosure is not limited to this particular number of terms. A choice of terms common in the literature may be expressed in accordance with Eqn. 2 below as follows:

$$\sum_{d_1, d_2, d_3}^{48} LUT_{d_1, d_2, d_3}(|x_{-d_1}|)[x_{-d_2} \text{ or } x^*_{-d_2}] \qquad \text{Eqn. 2}$$

$$[x^2_{-d_3} \text{ or } |x|^2_{-d_3} \text{ or } 1][sc \text{ or } 1]$$

where there are 48 different combinations of the delays d1, d2, d3 and corresponding LUTs for additional polynomial multiplier terms.

The above-referenced Equations are provided for clarity and in a non-limiting sense. Indeed, a large variety of approaches exist to model power amplifiers for the calculation of DPD coefficients. However, the most common approach is to sum the various non-linear terms as explained above. Other approaches to model long term effects involve averaging the signal from the past. Such terms may have the same form as above, although the signal x is replaced by a long term running average of the signal. It is noted that the term "term" as used herein may refer to any suitable type of function, such as a non-linear function, which has a corresponding coefficient. Thus, the term(s) may represent any parameters of the corresponding function (such as a non-linear function), although typical applications include the term being synonymous with a single multiplicative coefficient, making the final solution easier to compute. Thus, in such a case the terms may be synonymous with the function parameters, which may encompass the coefficients.

In any event, the optimal solution and required DPD terms depends upon the power amplifier used in the system. Parts of the non-linearity may be modelled by the common terms above, but often there is a need for more specific terms. Therefore, the hybrid solution to which the disclosure is directed implements a set of most common terms in the hardware accelerator to enable the flexibility to add new terms in a programmable manner to fine tune and improve the performance for any new power amplifier. The additional terms may include any suitable terms that may impact the DPD calculation and thus the performance of the PA in which the DFE is implemented. Some non-limiting terms include polynomial and LUT-based terms not computed or known by the hardware accelerator, terms with long term averages and/or a long term history of the signal to model the long term effects, etc.

Overall Architecture Implementation

Figure 4B:
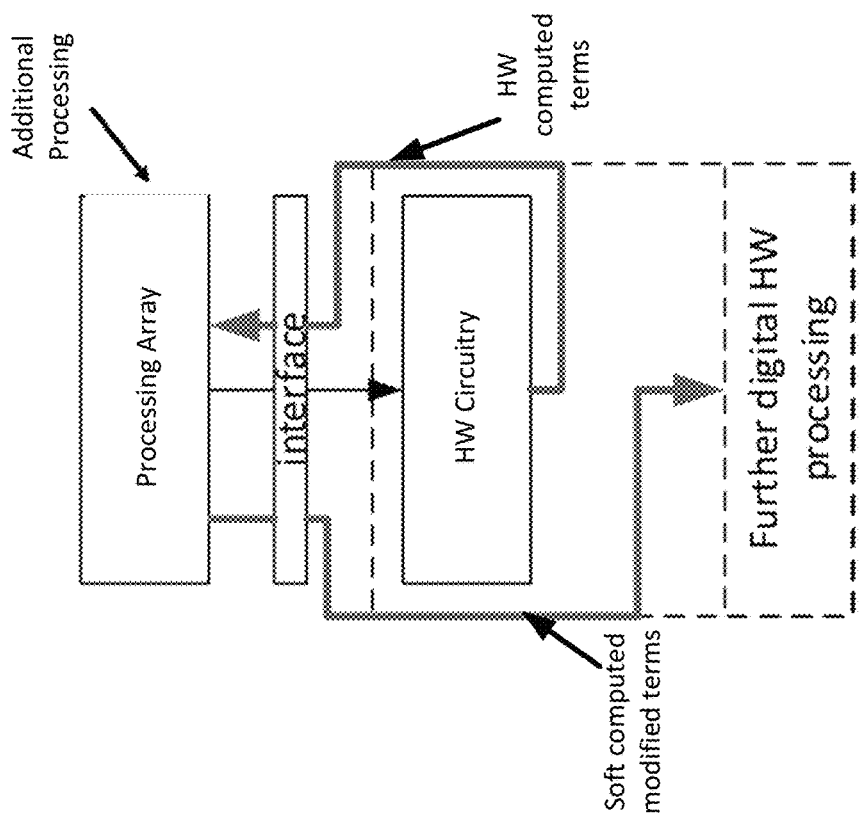
FIG. 4B illustrates a block diagram of a second hybrid programmable processing array and hardware accelerator architecture, in accordance with the disclosure, in accordance with the disclosure.
Figure 4A:
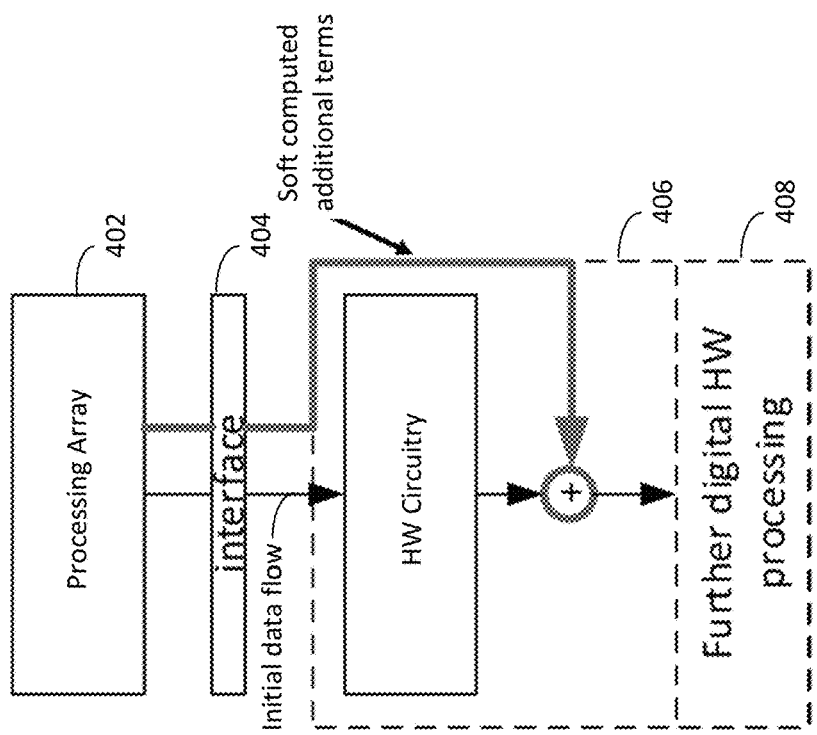
FIG. 4A illustrates a block diagram of a first hybrid programmable processing array and hardware accelerator architecture, in accordance with the disclosure, in accordance with the disclosure.

FIGS. 4A and 4B illustrate exemplary block diagrams of a hybrid programmable processing array and hardware accelerator architecture, in accordance with the disclosure. The various components of the hardware architectures 400, 450 as shown in FIGS. 4A and 4B, respectively, may be implemented on a single chip, such as a system on a chip (SoC), or on separate chips or SoCs. The implementation of the hardware architectures 400, 450 as part of an SoC may be particularly advantageous for applications using high data rates, as doing so obviates the need to couple signals between different chips or via other external devices.

The hybrid architectures 400, 450 as shown in FIGS. 4A-4B may be implemented to compute DPD terms or any other suitable terms in accordance with wireless communications or any other suitable application in accordance with any suitable techniques to do so, including known techniques and those discussed above. The hybrid architectures 400, 450 may additionally or alternatively be used to perform any suitable type of data computations or other functions in which data processing operations may be performed on arrays of data samples via a processing array and a hardware accelerator being implemented in conjunction with the processing array.

As discussed in further detail below, each hybrid architecture includes a processing array 402, which may be implemented as any suitable type of programmable array architecture that includes an array of processing elements (PEs), which may constitute any suitable number and/or type of PEs having any level of programmable functionality. In some scenarios, the processing array 402 may be implemented as a programmable vector processor having any suitable configuration and design as noted herein. As noted above, a vector processor may include any suitable type of processor that implements an instruction set using instructions designed to operate efficiently and effectively on large one-dimensional arrays of data samples referred to herein as vectors or data vectors. The processing array 402 may, when implemented as a vector processor, implement as the PEs any suitable number of execution units, which may also be referred to as cores, and which may be configured in any suitable manner as further discussed herein. In other scenarios, the processing array 402 may alternatively be implemented with any suitable number of alternate PEs. In accordance with such alternative scenarios, the processing array 402 may include, as the PEs, digital signal processor (DSP) blocks and/or PEs identified with an FPGA, individual DSP processing blocks of a larger DSP, etc.

In any event, the processing array 402 may receive, transmit, and/or perform processing operations on arrays of data samples, which may alternatively be referred to herein as data vectors regardless of the particular implementation of the processing array 402. Each vector of data samples may thus represent an array of any suitable number of data samples. The processing array 402 thus provides flexibility in the computations performed, as the processing array 402 may access instruction sets or otherwise be programmed to perform specific functions, which may include processing operations, the specific type being a function of the particular implementation of the processing array 402 and instructions that are executed at a particular time. That is, scenarios include the PEs of the processing array 402 performing processing operations or other suitable operations on the arrays of data as discussed herein to provide data bit manipulation, formatting, truncation, mathematical computations, etc.

Depending upon the current instructions provided to the individual PEs of the processing array 402, the PEs may or may not modify the values of the data samples, as further discussed herein. In some scenarios, the PEs may receive an array of data samples, which are then transferred to the hardware accelerator 406 without modifying their values as a result of the execution of the processing operations. This may include the use of processing operations that may reorder, reformat, or reorganize the arrays of data samples. In other scenarios, the processing operations may include modifying the array of data samples, which are then output as "soft" computed terms (as shown in FIG. 4A) or as soft computed modified terms (as shown in FIG. 4B).

In any event, the data interface 404 functions to transfer the array of data samples from each PE of the processing array 402 after processing operations have been performed to the hardware accelerator 406. This may correspond to the initial data flow arrow as shown in FIG. 4A, which is also the case for the hybrid architecture 450 as shown in FIG. 4B. To do so, and as further discussed below, data transfers between the hardware accelerator 406 and the processing array 402 are enabled via the coupled data interface 404. As discussed in further detail below, the data interface 404 may implement any suitable type and/or number of hardware and/or software components, digital logic, etc., to manage the translation of data from the arrays of data samples implemented via the processing array 402 to the data format implemented via the hardware accelerator 406, and vice-versa (i.e. when data is provided from the hardware accelerator 406 to the processing array 402). The data interface 404 also manages synchronization between the processors identified with the processing array 402 and the hardware accelerator 406.

As shown in FIGS. 4A-4B, each hybrid architecture 400, 450 also includes a hardware accelerator 406, which is configured to execute predetermined functions in accordance with any suitable type of hardwired architecture as noted herein, such as ASIC, a DSP, etc. The hardware accelerator 406 may implement any suitable number and/or type of processors and/or processing circuitry for this purpose, which may be partially or wholly represented by the HW circuitry blocks as shown. The HW circuitry blocks may include any suitable number of LUTs containing entries that are based upon the particular computational application for which each hybrid architecture 400, 450 is implemented. Although the hardware accelerator 406 is described herein as implementing a set of LUTs, the disclosure is not limited to the HW circuitry implementing LUTs in this manner to perform the HW term computation (i.e. the hard-computed terms). Instead, and as further discussed below, the hardware accelerator 406 may perform the HW term computation using a sum of terms that are derived in any suitable manner, which may be via the LUTs as described herein or via the evaluation of any suitable function. Such functions may include nay suitable type of polynomial functions as noted above with respect to Eqns. 1 and 2, which may represent non-linear functions and thus provide for the computation of non-linear terms. The use of LUTs may be particularly useful, however, for more complex functions.

In any event, the hardware accelerator 406 is configured to compute terms in accordance with a predetermined processing function using the array of data samples transferred via the data interface 404 to generate processed data samples. These processed data samples include a set of computed terms in accordance with the particular application for which the function or LUT entries corresponds, as the case may be. As shown in the scenario illustrated in FIGS. 4A-4B, the hardware accelerator 406 may implement as the HW circuitry blocks any suitable number K (such as 48) LUTs, each containing a set of digital data entries or values. The entries in the LUTs may correspond to a set of computed terms that enable a particular mathematical function to be evaluated using received data samples as inputs, which may include the array of data samples provided by the data interface 404 after the processing operations have been performed via the PEs of the processing array 402. Thus, when the LUTs are implemented in this manner, the hardware accelerator 406 facilitates the HW term computation via a summation of terms, which may be non-linear terms or any other suitable type of terms that are derived from the entries in the set of LUTs. This may include the use of a digital pre-distortion (DPD) function as noted herein as a non-limiting scenario, and in such a case the hardware accelerator 406 is configured to compute, as the terms in accordance with the DPD function, DPD coefficients used for a wireless data transmission.

Therefore, in a non-limiting scenario, the number of K LUTs may contain entries corresponding to the DPD terms as noted above, which may represent non-linear terms, and thus the hardware accelerator 406 functions to identify DPD terms for a particular digital data stream in this scenario by mapping (i.e. correlating) the array of data samples provided by the data interface 404 to entries in the number of K LUTs, which may represent one phase of the overall computation used to generate the hard-computed terms as discussed in further detail herein. That is, the hardware accelerator 406 may generate the hard-computed terms in this way in accordance with the Equations 1 and 2 above (or any other suitable techniques) by passing the array of data samples through the LUTs of the HW circuitry, which are then multiplied by the array of data samples or any suitable function (such as a polynomial function). This process may then be repeated for various delayed signal versions of the input signal, with the results being summed together as indicated in Equation 2 above to generate the hard-computed terms.

In other words, the hardware accelerator 406 is configured to compute the set of HW terms in accordance with a predetermined processing function by computing a sum of terms (such as non-linear terms) contained in the LUT entries using the array of data samples transferred via the data interface. Of course, the use of the hardware accelerator 406 to perform DPD computations, as well as the use of LUTs, are non-limiting scenarios that are provided for clarity and ease of explanation. The hardware accelerator 406 may implement any suitable number of LUTs and perform any suitable number and/or type of computations to evaluate any suitable type of predetermined mathematical function in accordance with a particular application. As another illustrative scenario, and as mentioned above, the hardware accelerator 406 may additionally or alternatively compute the set of HW terms in accordance with a predetermined processing function by summing terms (such as non-linear terms) in accordance with the evaluation of any suitable type of function. This function may be a polynomial function or any other suitable type of function that is based upon the particular application and/or implementation, and which may include the polynomial function(s) and techniques as described herein with reference to Eqns. 1-2.

FIGS. 4A and 4B provide two illustrative scenarios for the implementation of a hybrid architecture that includes the programmable processing array 402 and the hardware accelerator 406. These scenarios are shown in a non-limiting manner for ease of explanation and clarity. Although the initial data flow as noted above is the same for both of these architectures, the data flow implemented in each of the hybrid architectures 400, 450 differs from one another after the initial data flow has been completed.

With reference to FIG. 4A, the hybrid architecture 400 may be particularly advantageous for applications in which a minimal (or at least reduced) bandwidth is desirable over the data interface 404. The hybrid architecture as shown in FIG. 4A implements summation circuitry (also referred to herein as an adder) that couples the set of terms computed via the hardware accelerator 406 with additional "soft" terms computed by the PEs of the processing array 402. That is, one or more of the PEs of the processing array 402 may perform processing operations on an array of data samples to generate an array of processed data samples that include a set of additional soft-computed terms. These additional soft-computed terms are converted from the array of data samples used by the PEs of the processing array 402 to a format that is implemented by the hardware accelerator 406. The data interface 404 also synchronizes the set of additional soft-computed terms with the set of hard-computed terms computed via the hardware accelerator 406, i.e. the terms computed by correlating a separate array of data sample received via the data interface 404 with the LUT entries, and once again performing the multiplication and summing operations.

In this way, the hybrid architecture 400 facilitates the processing array 402 providing additional soft-computed terms that may then be added (synchronously) to the set of hard-computed terms computed by the hardware accelerator 406 to provide a set of processed data samples that include both sets of terms. The additional soft computed terms may be calculated via the processing array 402 in a fully flexible manner, as the processing array 402 is a programmable component and may perform processing operations via the PEs in accordance with a modifiable instruction set. Thus, the order, type, and manner in which the processing operations are executed on arrays of data samples via the PEs of the processing array 402 may be modified via alteration of the instruction sets used by the processing array 402. Again, in some non-limiting scenarios, these additional soft computed terms may include DPD terms (i.e. coefficients) for correcting long term effects or trapping effects in some power amplifiers, IQ imbalance correction, etc. In this way, the hardware accelerator 406 functions to provide common computations of DPD terms that are not as likely to change over time, whereas the additional terms provided by the processing array 402 may address other operating parameters of the power amplifier or components in the RF chain that may vary over time or are otherwise less predictable.

Turning now to FIG. 4B, the hybrid architecture 450 provides full flexibility to add terms and/or to modify the results of the set of terms computed by the hardware accelerator 406 using the PEs of the processing array 402. That is, the results of the terms computed by the hardware accelerator 406 in this configuration are fed back to the processing array 402 via the data interface 404. The data interface 404 is configured in this architecture to transfer the processed data samples generated by the hardware accelerator 406, which includes the set of hard-computed terms, to one or more of the PEs in the processing array 402 as an array of data samples. The PEs of the processing array 402 may then perform further computations on the array of data samples constituting the hard-computed terms to generate a further array of data samples including a set of soft-computed modified terms, which may then be transferred to the hardware accelerator 406 via the data interface 404.

The hardware accelerator 406 is thus configured to output these further processed "soft" data samples, which may include a set of additional and/or modified computed terms, from the further array of data samples. In this way, not only is the hybrid architecture 450 capable of adding terms to those computed by the hardware accelerator 406, but the processing array 402 may also perform additional data processing operations that may be needed. Such an architecture may be particularly useful for some linear or non-linear filtering of signals used in wireless data communications to improve performance. In another scenario, such a hybrid architecture may be particularly useful to perform IQ imbalance correction.

Thus, the data interface 404 may also function, as is the case for the hybrid architecture 450, to transfer the data samples output by the hardware accelerator 406, which may include hard-computed terms as noted herein, to the PEs of the processing array 402. However, this results in a 50% reduction in the bandwidth of the data interface block 404 due to increased data traffic. Such solutions may be particularly useful for applications that are not as sensitive to decreases in bandwidth requirements, or applications that acknowledge such a bandwidth decrease as an acceptable tradeoff for the full flexibility in the term calculations.

In any event, the HW portion 406 for each of the hybrid architectures 400, 450 may output processed data samples to a processing block 408 for further digital processing. Thus, the processing block 408 may represent any suitable number and/or type of processors, processing circuitry, hardware components, and/or software components depending upon the particular application. As one illustrative scenario in which DPD terms are computed as noted above and the hybrid architectures 400, 450 may be implemented as part of the DFE of a wireless communication device, the processing block 408 may be identified with the application of the DPD terms to a transmitted data stream in accordance with any suitable techniques, including known techniques, digital-to-analog conversion, analog-to-digital (conversion (for the RX data path) up-conversion to a transmission frequency, down-conversion to an IF or baseband frequency, additional filtering, etc.

Figure 5A:
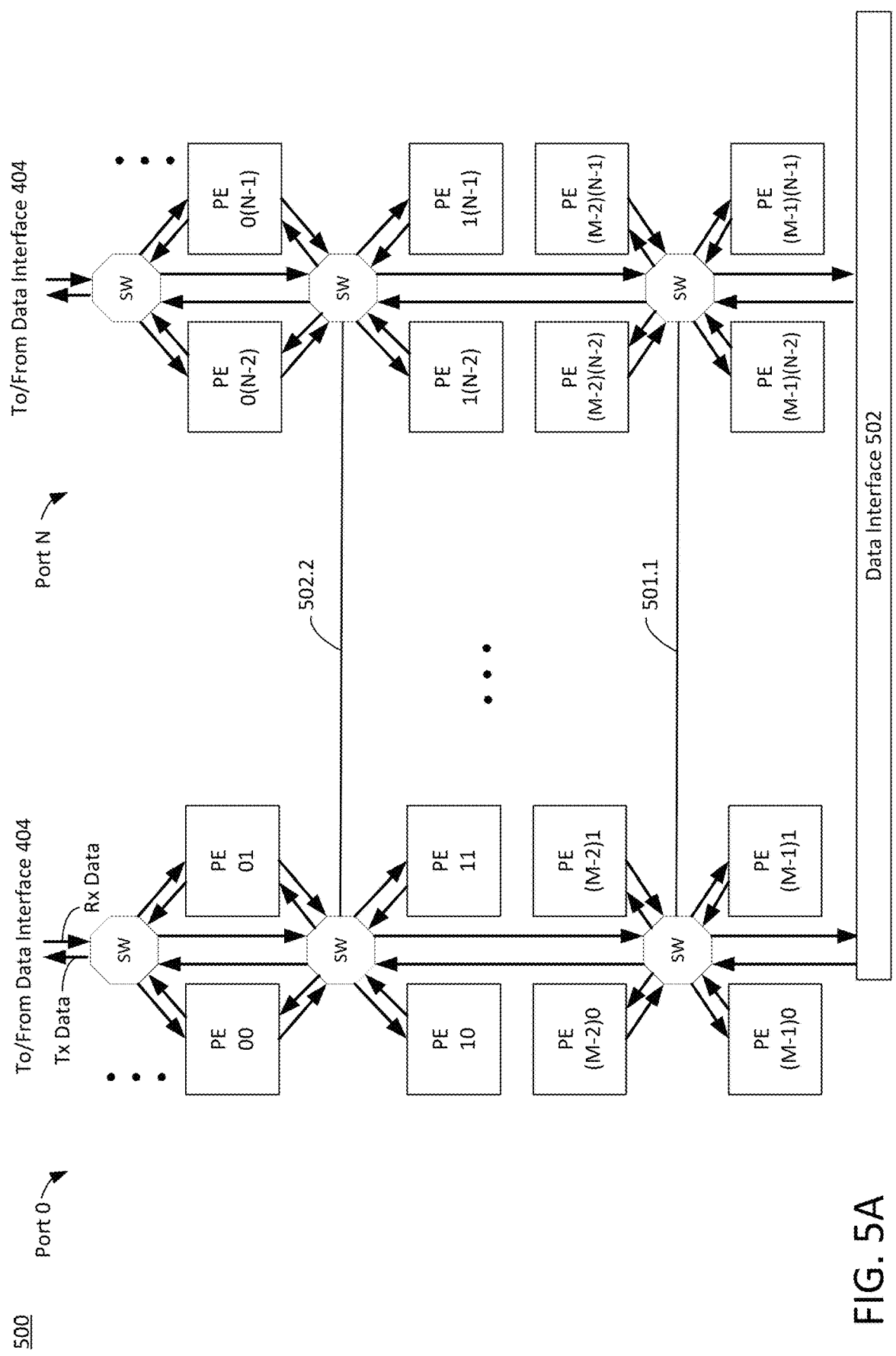
FIG. 5A illustrates a block diagram of a programmable processing array portion of a hybrid programmable processing array and hardware accelerator architecture, in accordance with the disclosure.

FIG. 5A illustrates a block diagram of a programmable processing array portion of a hybrid programmable processing array and hardware accelerator architecture, in accordance with the disclosure. The hybrid architecture portion 500 as shown in FIG. 5A further illustrates details of the processing array 402 as shown in FIGS. 4A and 4B. Thus, the processing array 402 may include any suitable number N of ports, with each port including any suitable number M of processing elements (PEs), each of which may form part of the processing array architecture as noted above. Although each port is shown in FIG. 5A as including 8 PEs, this is for ease of explanation and brevity, and the processing array 402 may include any suitable number of such PEs per port. Thus, the processing array 402 may include a mesh of PEs, the number of which being equal to the number of PEs per port (M) multiplied by the total number of ports (N). Thus, for an illustrative scenario in which the processing array 402 includes 8 ports and 8 PEs per port, the processing array 402 would implement (M×N)=(8×8)=64 PEs. Each of the PEs in each respective port are coupled to a data interface 502 via a dedicated data bus. The data bus as shown in FIG. 5A is adapted for use in a DFE used for wireless communications, and thus the dedicated bus includes a TX and an RX data bus in this non-limiting scenario. Moreover, in accordance with such a configuration, each port may be identified with a respective antenna that is used as part of a multiple-input multiple-output (MIMO) communication system. Thus, the number of antennas used in accordance with such systems may be equal to the number of ports N, with each port being dedicated to a data stream transmitted and received per antenna.

The data interface 502 may represent any suitable type of data interface that is configured to provide data to be transmitted onto the TX data bus and to receive data that has been received via the RX data bus. Thus, the data interface 502 may be implemented as any suitable type of data interface for this purpose, such as a standardized serial interface used by data converters (ADCs and DACs) and logic devices (FPGAs or ASICs), and which may include a JESD interface and/or a chip-to-chip (C2C) interface. In accordance with the present illustrative scenario in which the processing array 402 is implemented as part of a DFE, the data interface 502 may be coupled to a data modem to facilitate the transmission and reception of data in accordance with any suitable data rate and/or communication protocol. In accordance with conventional DFE applications that use hardwired solutions as noted herein, the data interface 502 may typically be coupled directly to such components. However, to provide the hybrid functionality as discussed herein to realize the benefits of both programmable and hardwired implementations, the hybrid architecture portion 500 includes the data interface 502 being coupled to the processing array 402, which is in turn coupled to the hardware accelerator 406 via the data interface 404, as discussed in further detail below.

Each of the PEs in each port of the processing array 402 may be coupled to the TX and the RX data bus, and each PE may perform processing operations on an array of data samples retrieved from the TX or the RX data bus as discussed herein. The access to the array of data samples included in the PEs may be facilitated by any suitable configuration of switches (SW), as denoted in FIG. 5A via the SW blocks. The switches within each of the ports of the processing array may also be coupled to one another via interconnections 501, with two being shown in FIG. 5A for the illustrative scenario of each port including 8 PEs. Thus, the interconnections 501.1, 502.2 function to arbitrate the operation and corresponding data flow of each grouping of 4 PEs within each port that are respectively coupled to each local port switch. The flow of data to a particular grouping of PEs and a selection of a particular port may be performed in accordance with nay suitable techniques, including known techniques. In one illustrative scenario, this may be controlled via an SoC, system and/or global system clock of which the processing array 402, the data interface 404, and the hardware accelerator 406 form a part.

Thus, at any particular time, one or more of the PEs may access an array of data samples provided on the TX data bus or the RX data bus to perform processing operations, with the results then being provided onto the respective TX or RX data bus. In other words, any number and combination of the PEs per port may sequentially or concurrently perform processing operations to provide an array of processed data samples to the TX data bus or the RX data bus. The decisions regarding which PEs perform the processing operations may be controlled via operation of the switches, which may include the use of control signals in accordance with any suitable techniques, including known techniques. However, and as further discussed below, the data interface 404 functions to couple the processing array 402 to the hardware accelerator 406, and thus knowledge regarding which PE has provided the processed array of data samples and at what time is leveraged to facilitate the synchronization process between the processing array 402 and the hardware accelerator 406. As further discussed herein, this information may be known by the SoC, system, and/or global system clock of which the processing array 402, the data interface 404, and the hardware accelerator 406 form a part.

Figure 5B:
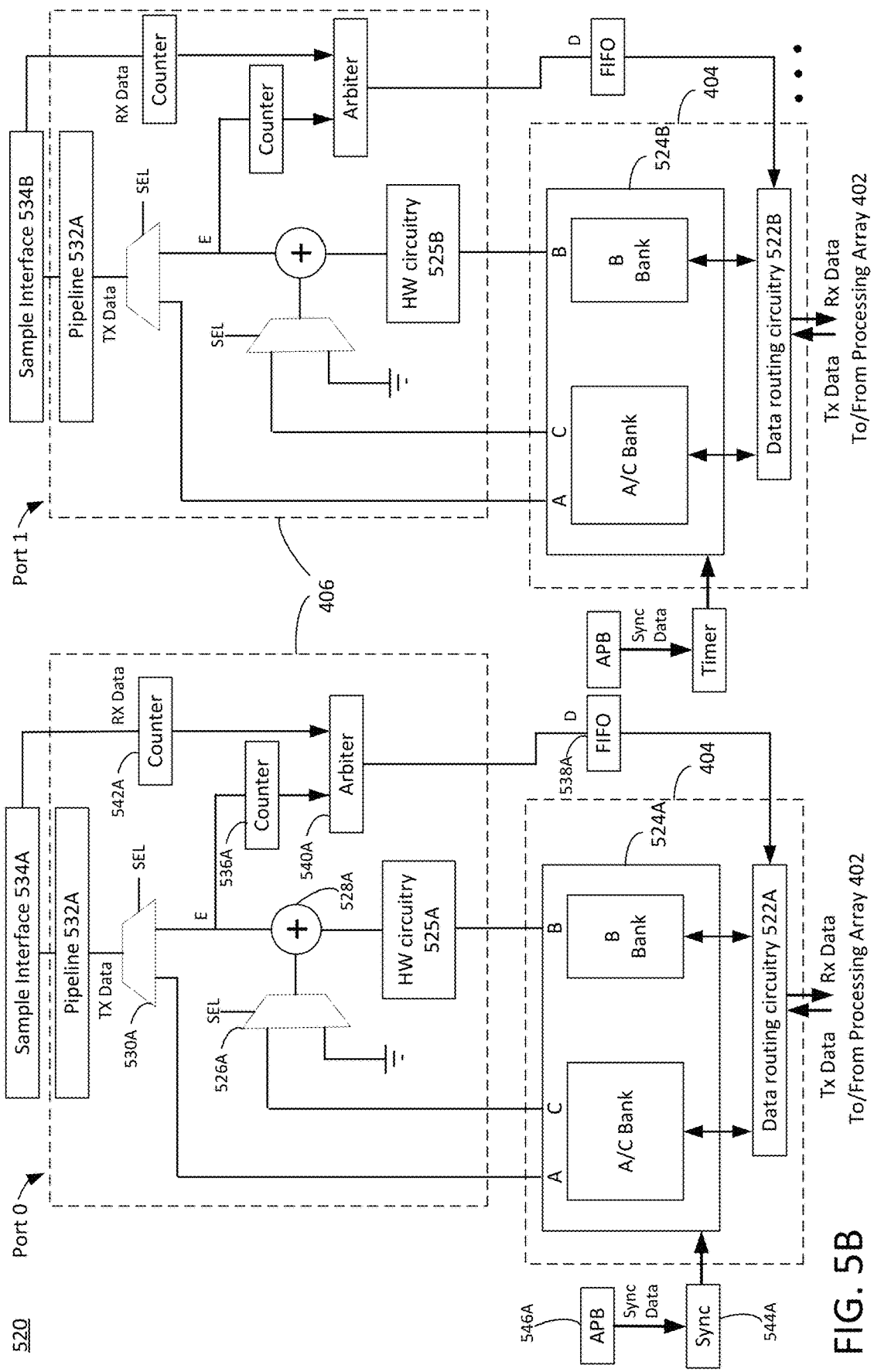
FIG. 5B illustrates a block diagram of a data interface and hardware accelerator portion of a hybrid programmable processing array and hardware accelerator architecture, in accordance with the disclosure.

FIG. 5B illustrates a block diagram of a data interface and hardware accelerator portion of a hybrid programmable processing array and hardware accelerator architecture, in accordance with the disclosure. Although the hybrid programmable processing array and hardware accelerator architecture may include any suitable number of N ports as discussed herein, two ports (port 0 and port 1) are shown in the Figures for purposes of brevity. Reference is made with respect to port 0 as shown in the Figures, although it will be understood that each port may have the same or identical configuration as port 0. As shown in FIG. 5B, the data interface 404 includes data routing circuitry 522A and a memory 524A (port 1 may have an identical configuration, with the suffixes A and B used to denote these different components among the different ports). In some scenarios as further discussed below, the hybrid programmable processing array and hardware accelerator architectures 400, 450 may implement any suitable number of ports, with a subset of such ports being configured to operate in a "ganging" configuration. In some scenarios, and as discussed in further detail below, such ganging implementations may combine two or more ports to operate in parallel with one another, such as port 0 and port 1 as shown in the Figures. In accordance with such implementations, two ports may work in parallel such that the hardware accelerators 406 identified with each respective port work in a chain configuration, thereby doubling the computational performance. As further discussed below, such implementations may still use a single DAC and antenna chain, although the computational performance of the hardware accelerators (and the number of LUTs when applicable) is doubled. Such ganging implementations may be particularly useful to increase functionality for performing DPD computations, as such computations are additive in nature.

Moreover, the data interface 404 and the hardware accelerator 406 as shown in FIG. 5B may be implemented to support both of the different hybrid architectures 400, 450 as shown in FIGS. 4A-4B. That is, although the different hybrid architectures 400, 450 as shown in FIGS. 4A-4B correspond to different respective data flows, the data interface 404 and the hardware accelerator 406 as shown in FIG. 5B may be dynamically reconfigured to support either of these data flows depending upon the particular application or other design considerations, as noted in further detail below.

To do so, the memory 524A may be implemented as any suitable type of memory of any suitable size depending upon the particular application. The memory 524A represent any suitable type of storage such as volatile or a non-volatile memory, and which may have any suitable size, addressable space, and address configuration depending upon the size of the data samples that are loaded. The data stored in the memory 524A may be stored as arrays of data samples after processing operations have been performed by the PEs within each respective port, and thus the memory 524A may be partition, formatted, or otherwise organized in accordance with any suitable addressing scheme. The addressing scheme, size of data contained at each address, and/or the addressable range of the memory 5424A is a function of the number of PEs per port, as well as the data array size used by the PEs of the processing array 402. In one scenario, the memory 524A may be implemented as having two or more data banks of memory, each data bank having a number of partitions equal to the number of PEs, such that arrays of data samples provided by each PE may be stored in the each respectively assigned partition, as further discussed below. In various scenarios, the memory 524A may be sized to store any suitable number of data samples such as 16K, 32K, 64K, 128K, etc. The memory 524A may thus function as a data buffer to enable the hardware accelerator 406 to perform processing operations on the arrays of data samples transferred from the processing array 402.

Figure 5C:
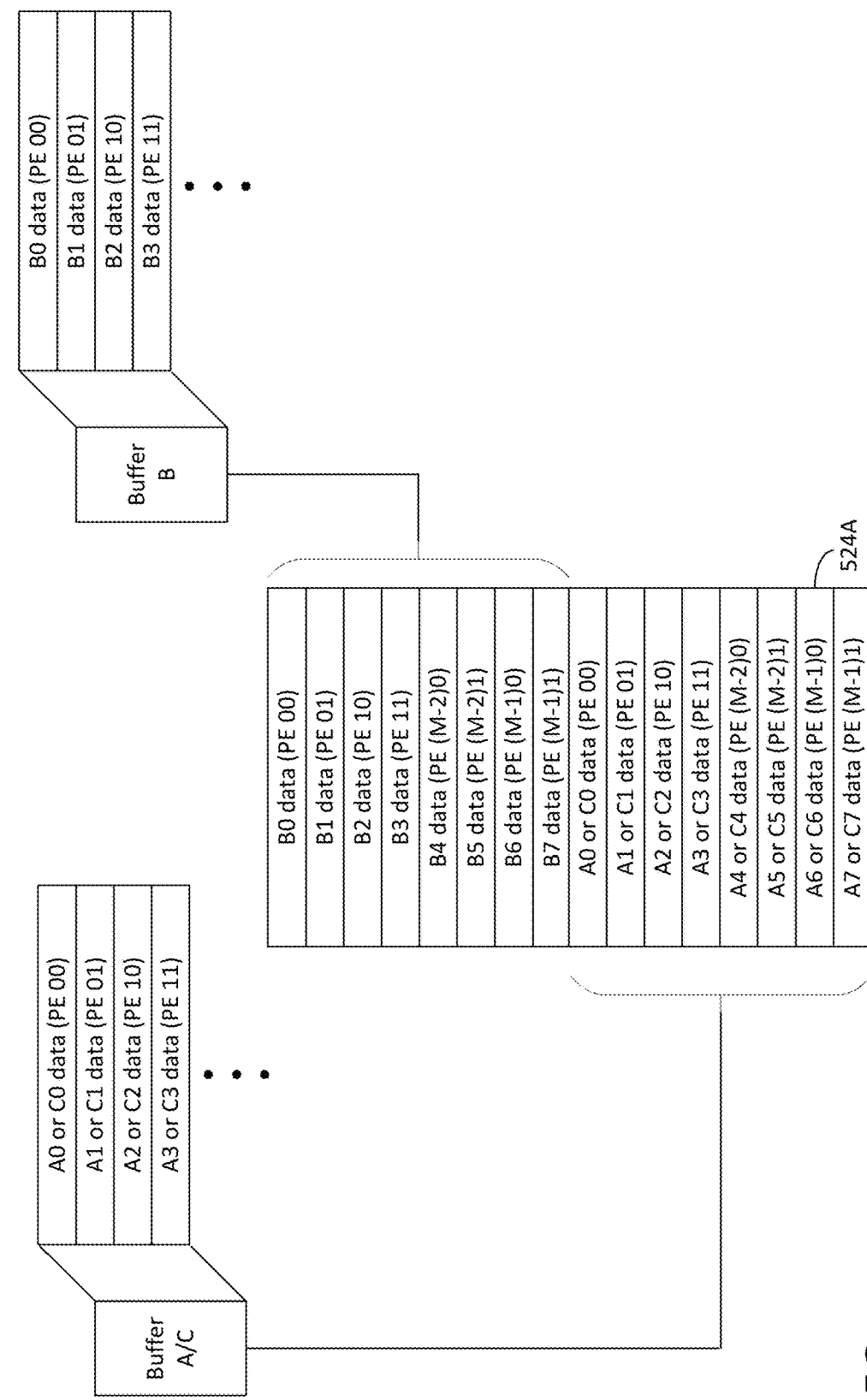
FIG. 5C illustrates a block diagram of a buffer used as part of the data interface of a hybrid programmable processing array and hardware accelerator architecture, in accordance with the disclosure.

In any event, the overall size of the memory 524A may be split into two data banks as shown in FIG. 5B, with each data bank being identified with data provided by the PEs of the processing array 402 in accordance with a particular data flow. Thus, in an illustrative scenario in which the memory 524A may be sized to store 32K data samples, the B data sample bank may store 16K samples, with a maximum of 2K samples being stored in each of eight respective partitions, with each partition being assigned to data provided by one of the 8 PEs as shown in FIG. 5C.

The other data bank may be shared between data referred to herein as an A data sample bank and a C data sample bank, with the contents of each data bank corresponding to the data flow identified with the different hybrid architectures 400, 450 as discussed above with reference to FIGS. 4A-4B. It is noted that although the memory 524A may include two data banks, the entire contents of the A/C data bank at any particular time is dedicated to one of the data flows as described herein with respect to the different hybrid architectures 400, 450. In particular, when the contents of the A/C data bank is identified with the 'C' data flow, the hardware accelerator 406 is configured to operate in accordance with the hybrid architecture 400 as shown in FIG. 4A. However, when the contents of the A/C data bank is identified with the 'A' data flow, the hardware accelerator 406 is configured to operate in accordance with the hybrid architecture 450 as shown in FIG. 4B.

In other words, the A/C data bank may be partitioned in an identical manner as the B data bank, although the contents of the A/C data bank depends upon the particular operating mode of the hardware accelerator 406. The B data bank, however, is dedicated to the "initial" data flow as noted above and shown in FIGS. 4A-4B, and thus the contents of the B data bank is used in accordance with the initial transfer of the array of data samples from the PEs of the processing array 402, which applies to both of the hybrid architectures 400, 450. It is also noted that the partitions in each of the A/C and B data banks need not be equal to one another as illustrated in FIG. 5C. That is, the PE-specific address partitions in each of the A/C and B data banks may be of any suitable size, and may be the same as one another or different than one another, and may differ within the same data bank. To provide an illustrative scenario, the B0 and B1 addresses in the B data bank may be configured to store 4K samples each, with the B2-B3 addresses storing 2K samples each, and the B4-B7 addresses storing 1K samples each. The A/C data bank may be of the same size or a different size than the B data bank, and may include partitions having the same or different addressable configurations as one another and/or the B data bank.

Furthermore, it is noted that although the address ranges of the buffer 524A as shown in FIG. 5A are identified with specific PEs of the processing array 402, this is a non-limiting scenario. The address ranges of the buffer 524A (and the buffer 524 identified with each port) may be correlated to specific PEs in predetermined manner or, alternatively, the address ranges of the buffer 524A may be provided by the PE dynamically and/or arbitrarily. Thus, regardless of whether the address range of the buffer 524A is predetermined or identified by the PE at the time the data is written to the buffer 524A, the location of the address for a specific PE and associated array of data samples is known to the data routing circuitry 522 of each port. Thus, the same PE may write arrays of data samples to multiple lines in one of the buffers 524, with the data routing circuitry 522 identifying the address in each case. This enables the synchronization of data for the data samples stored in the B data bank and the A/C data bank when such data samples are written to and/or retrieved from the buffer 524A at different times, as further discussed herein.

In any event, the data routing circuitry 522A is configured to transfer the array of data samples from the PEs of the processing array 402 to the hardware accelerator 406 by writing each array of data samples to a predetermined range of addresses in the data memory 524A based upon which one of the PEs provided (i.e. output or generated) the array of data samples. In other words, the data routing circuitry 522A functions to identify, for each array of data samples received via the data interface 402, the corresponding PE that generated that array of data samples (i.e. PE00, PE01, PE10, PE11 . . . PE(MN), etc.). To do so, each PE may include any suitable type of identifier, which may be encoded bits, which function to identify the PE that generated the array of data samples, and may additionally encode the type of data samples that are being generated in accordance with the operating mode of the hardware accelerator. The data routing circuitry 522A may be implemented as any suitable number and/or type of processors, processing circuitry, executable instructions, a microcontroller, etc., that is configured to recognize this predetermined encoded information and, in response, store the array of data samples in the corresponding address in the memory 524A.

Therefore, regardless of whether the hardware accelerator 406 is configured to operate in accordance with the hybrid architecture 400 as shown in FIG. 4A or the hybrid architecture 450 as shown in FIG. 4B, the data routing circuitry 522A stores the initial data flow of each array of data samples in the B data bank of the memory 524A. The hardware accelerator 406 then accesses this range of addresses from the memory 524A as shown in FIG. 5C based upon the array of data samples to be used for a hardware computation in accordance with each particular PE. The hardware accelerator 406 uses the array of data samples accessed from the corresponding address range of the B data bank to compute terms in accordance with a predetermined processing function by correlating the array of data samples to the entries stored in the LUTs identified with the HW circuitry 525A, as discussed above (as well as performing multiplication and summing as noted herein).

However, the subsequent data flow may change depending upon the operating mode of the hardware accelerator 406. It is noted that the flow of data within the hardware accelerator 406 is controlled via the various logic components as shown in FIG. 5B, which may be controlled or otherwise arbitrated the SoC, system, and/or global system clock of which the processing array 402, data interface 404, and hardware accelerator 406 form a part. This may include a device that implements the hybrid architectures 400, 450, as discussed in further detail below with respect to FIG. 7. Such a device may also function to control the data routing circuitry 522A as noted above to ensure that the data arrays are stored in the corresponding addresses of the memory 524A.

To provide an illustrative scenario, for the hybrid architecture 400 as shown in FIG. 4A, one or more of the PEs may perform processing operations on another array of data samples to generate an array of processed data samples, which may again include a set of additional soft-computed terms, as noted above. In this configuration, the data routing circuitry 522A stores the array of processed data samples including the set of soft-computed terms in the portion of the memory 524A identified with the C data bank, with the array of processed data samples being stored in a partition of address ranges of the C data bank as shown in FIG. 5C that correlates to each respective "source" PE, i.e. the PE that generated the array of processed data samples. A logic level of a select (SEL) control of a mux 526A is then set such that the summation circuitry 528A receives the array of data samples stored in the C bank of the memory 524A, which includes the soft-computed terms, which are then added to the hard-computed terms output by the LUTs identified with the HW circuitry 525A as shown in FIG. 5B. The result is that the initial hard-computed terms (computed via the hardware accelerator 406) are added to the soft-computed terms (computed via the processing array 402), which is represented as the data flow E in FIG. 5B.

The data samples for the B data bank and the C data bank may be synchronized via the data routing circuitry 522A using the synchronization circuitry 544. In other words, the data stored in the C data bank may be provided from a different PE than the data stored in the B data bank, i.e. the data stored in the C data bank may be provided with a delay compared to the data stored in the B data bank, and thus the data stored in the B and C data banks are synchronized. The synchronization circuitry 544 may be implemented as any suitable combination of hardware and/or software components. In one illustrative scenario, the synchronization circuitry 544 may be implemented as any suitable type of timer. Regardless of the particular implementation, the synchronization circuitry 544 may receive synchronization data from the SoC, system, and/or global system clock of which the processing array 402 and hardware accelerator 406 form a part. This may include a separate or integrated microcontroller implemented for the purpose of monitoring and/or arbitrating the data flow of the data samples between the hardware accelerator 406 and the processing array 402. The synchronization data may be provided in this way using knowledge of the when each PE generated the array of data samples, as well as the instructions used to generate the initial hard computed terms and the new soft-computer terms.

The synchronization circuitry 544A may receive the synchronization data from any suitable source and in accordance with any suitable communication protocol. In one scenario, the synchronization data may be provided via an Advanced Peripheral Bus (APB) interface 546A via a suitable system component of which the processing array 402, data interface 404, and hardware accelerator 406 form a part. In any event, the synchronization circuitry 544A is configured to provide suitable trigger control signals to delay the start of data processing of data samples stored in the B data bank by the hardware accelerator 406 until the array of data samples have been stored in the C data bank, thereby ensuring synchronization of the processing of the data samples stored in the B and C data banks. It is also noted that the synchronization circuitry 544A may ensure synchronization of data samples in this way by compensating for any suitable number and/or type of system delays. This may include delays introduced by the hardware accelerator 406, which may include processing time, time to perform computations in accordance with the LUTs identified with the HW circuitry 525, etc. Such delays may be known a priori, measured, and/or adapted to the known and/or measured system properties. Thus, the synchronization circuitry 544A may function to provide a delay that may be dynamically adjusted or predetermined, in various implementations. In this way, it is ensured that the data samples are properly synchronized (which may include time alignment) for the summation circuitry 528A adding to be properly performed.

Figure 5D:
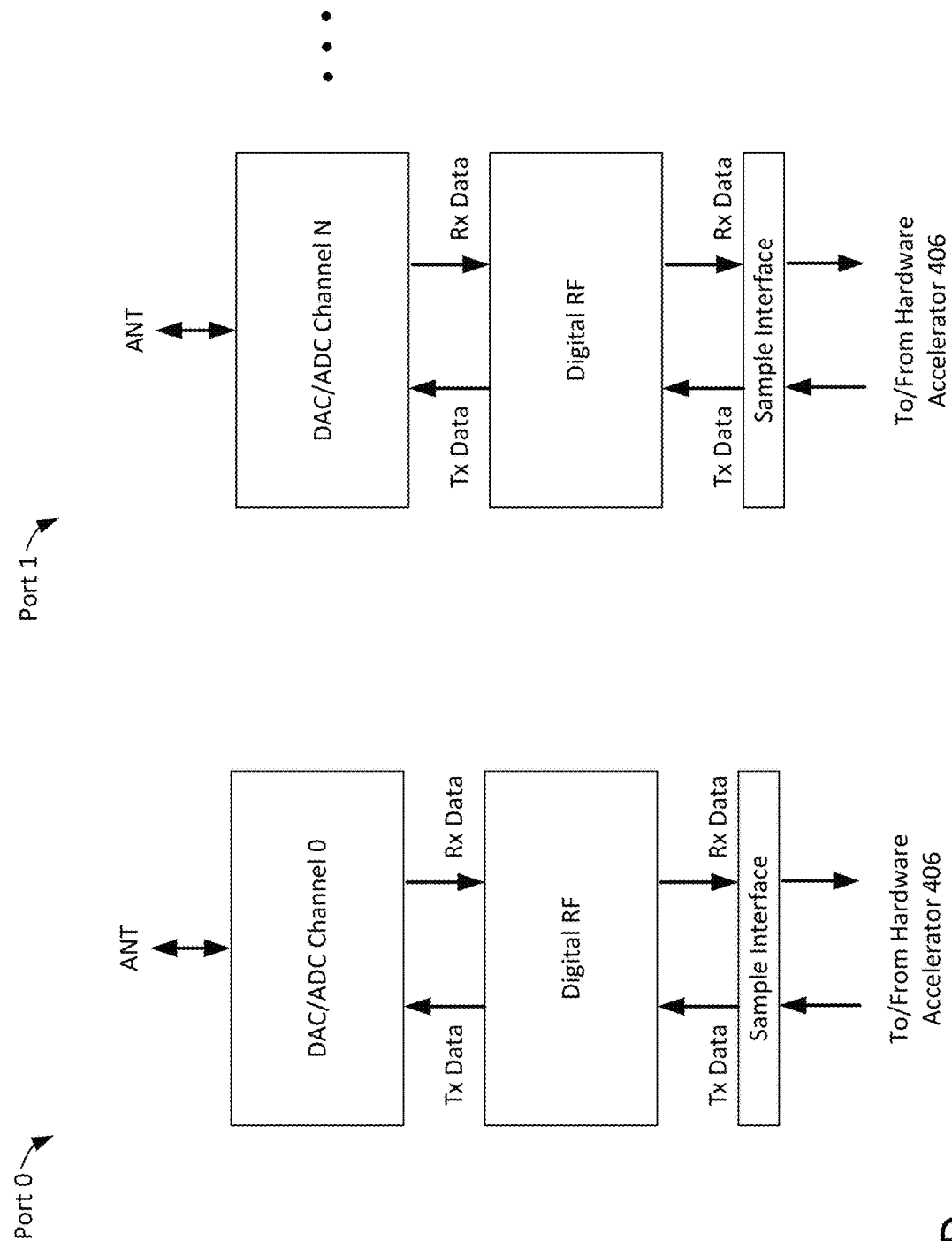
FIG. 5D illustrates a block diagram of an RF front end used as part of a hybrid programmable processing array and hardware accelerator architecture, in accordance with the disclosure.

Once the combined hard- and soft-computed terms are summed together via the summation circuitry 528A, the logic level of the select (SEL) control of the mux 530A is then set such that the combined soft- and hard-computed terms are provided to the data pipeline 532A and, in turn, the sample interface 534A. The data pipeline 532A and the sample interface 534A may be implemented as any suitable combination of hardware components, software components, and/or processing circuitry to regulate the flow of data to another component in accordance with the particular application. In one scenario, the combined soft- and hard-computed terms are coupled, via the data pipeline 532A and the sample interface 534A, to a corresponding digital front end as shown in FIG. 5D, which includes the application of the terms and the transmission of data using any suitable wireless communication protocol.

As another illustrative scenario, for the hybrid architecture 450 as shown in FIG. 4B, the data interface 404 is configured to transfer the processed data samples including the set of hard-computed terms from the output of the HW circuitry (HW) block 525 to the one of the of the PEs of the processing array 402 as an array of data samples. To do so, a logic level of the select (SEL) control of the mux 526A is then set such that the summation circuitry does not receive the array of data samples stored in the C bank of the memory 524A, but instead receives 0 (GND) data values that are added to the hard-computed terms such that the values of the hard-computed terms output via the LUTs identified with the HW circuitry block 525A are not affected. The hard-computed terms, i.e. the data samples, are then provided to the data routing circuitry 522A as an N-bit word value in accordance with the corresponding size of the array of data samples used by the PEs. The counter 536A functions to track an address index of the hard-computed data samples in this way, which is used to increment the address in which the data samples are then stored in the FIFO buffer 538 as represented by the data flow D. The data samples stored in the FIFO 538 may thus represent an array of data samples corresponding to the hard-computed terms.

It is noted that the RX data samples as shown in FIG. 5B are identified with data received from one or more coupled antennas via a receive path, which may be used at the same time as the transmit path during operation in a frequency division duplex mode. For operation in a time division duplex mode, either the transmit or the receive path that is active at one time. In any event, the arbiter 540A may be configured as any suitable type of switch, data router, etc., to control the data provided to the FIFO buffer 538, which may alternatively store RX data samples received via the antenna. The data routing circuitry 522A may thus utilize knowledge of the index tracked by the counter 536A to retrieve the array of data samples from the corresponding address in the FIFO buffer 538A, which is then transferred back to one or more of the PEs as a an array of data samples.

As noted above for FIG. 4B, the one or more PEs may then perform one or more processing operations on the array of data samples transferred via the data interface 404 to generate a further array of data samples, which may include what is referred to herein as the soft-computed modified terms. The soft-computed modified terms may include a set of additional and/or modified computed terms as discussed above with reference to FIG. 4B. The data routing circuitry 522A may then transfer this array of data samples to the A data bank of the memory 524A, again storing the array of data samples in the memory 524A at address locations that correspond to those PEs that generated the array of data samples. The synchronization circuitry 544A may again trigger the array of data samples being read from the A data bank of the memory 404. Then, a logic level of the select (SEL) control of the mux 530A is set such that the array of data samples stored in the A data bank of the memory 524A are provided to the data pipeline 532A and the sample interface 534A. Once provided in this manner, the data pipeline 532A and the sample interface 534A may utilize the array of data samples in any suitable manner, as discussed above.

Figure 6:
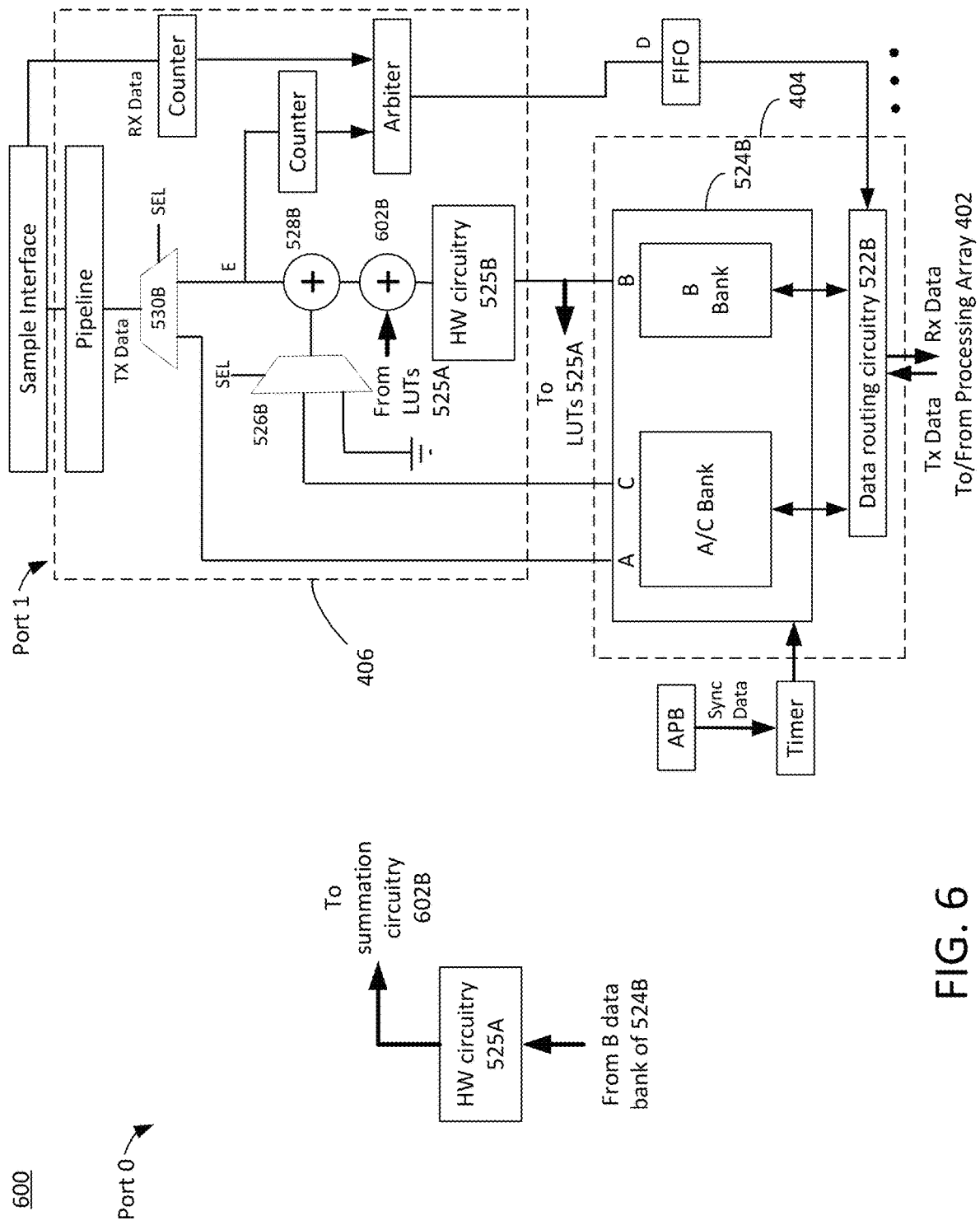
FIG. 6 illustrates a block diagram of a ganging configuration data flow, in accordance with the disclosure.

FIG. 6 illustrates a block diagram of a ganging configuration data flow, in accordance with the disclosure. As noted above, two ports (or more) of the hybrid architectures 400, 450 may work in parallel with one another. This parallel configuration of two or more ports may be referred to herein as a "ganging" implementation. The ganging implementation as shown in FIG. 6 may optionally be implemented in accordance with the hybrid architectures 400, 450 as shown in FIGS. 4A-4B. To do so, one or more of the hardware accelerators 406 identified with a respective port of the hybrid architecture 400, 450 may implement an additional summation circuitry 602B, which is coupled to the output of the HW circuitry 525 of each respective hardware accelerator 406 configured in this manner. In the illustrative scenario as shown in FIG. 6, the summation circuitry 602B is coupled to the output of the HW circuitry 525A (identified with the hardware accelerator 406 of port 0) to the output of the HW circuitry 525B (identified with the hardware accelerator 406 of port 1). Thus, in this configuration, ports 0 and 1 operate in a ganging configuration. Although not shown in the Figures for purposes of brevity, any suitable number of the hardware accelerators 406, each being identified with a separate port, may implement the summation circuitry 602 in accordance with any suitable number and/or type of switches, arbiters, routing circuitry, etc., such that the summation circuitry 602 may be optionally used when the hardware accelerator 406 is operating in the ganging implementation, and otherwise remain unused.

In any event, the hardware accelerator 406 identified with each of the ports 0 and 1, respectively, is fed data accessed from the B data bank that has been stored via the data routing circuitry 522B, which in this scenario is identified with the initial data flow as discussed herein. Thus, this initial data flow B is the same for the ganging implementations used in accordance with either of the hybrid architectures 400, 450. In each case, each hardware accelerator 406 then uses the array of data samples accessed from the corresponding address range of the B data bank to compute terms in accordance with a predetermined processing function by correlating the array of data samples to the entries stored in the LUTs identified with the HW circuitry blocks 525A and 525B, as discussed above (as well as performing multiplication and summing as noted herein). This generates two separate sets of terms, one per each hardware accelerator 406 identified with each respective port. These separate sets of terms are then added together via the summation circuitry 602B and output to the summation circuitry 528B. Thus, the initial B data flow in the ganging implementation corresponds to a sum of terms computed via the two separate hardware accelerators 406, i.e. the hardware accelerator 406 identified with each of the ports 0 and 1.

The remainder of the data flow that follows for this ganging implementation is similar to that described above with reference to FIG. 5B, and depends upon the particular hybrid architecture that is implemented. For the hybrid architecture 400 as shown in FIG. 4A, the data samples are accessed from the C data bank, which have processed by the processing array 402 and stored in the C data bank via the data routing circuitry 522B and include additional soft-computed terms. These soft-computed terms are further summed with the hard-computed terms that have been summed via the summation circuitry 602B. Again, this is implemented via the control of the mux 526B via the use of any suitable control signal for the SEL line. The SEL line of the mux 530B is further set to output the data samples, which include the soft-computed terms that are have been added to the hard-computed and summed terms, to the pipeline and sample interface for data transmission, as noted above.

For the hybrid architecture 450 as shown in FIG. 4B, the hard-computed terms that are summed via the summation circuitry 602B are fed back to the processing array 402 for further processing. Again, this is implemented via the use of the mux 526B with any suitable control signal for the SEL line such that the summation circuitry 528B does not add further terms to the summed hard-computed terms. The counter, arbiter, and FIFO buffer as shown in FIG. 6 function in the same manner as described above with reference to FIG. 5B, such that the data routing circuitry 522B transfers the summed hard-computed terms output via the summation circuitry 528B to the PEs of the processing array 402, which may perform or more processing operations to generate soft-computed modified terms. Again, these soft-computed modified terms may then be transferred to the A data bank of the buffer 524B as discussed above for data transmission. That is, the resulting soft-computed modified terms may be output to the pipeline and sample interface in the same manner as discussed above for the ganging implementation in accordance with the hybrid architecture 400 by controlling the SEL line of the mux 530B, as noted above. Thus, for both the non-ganging and the ganging implementations, the hybrid architecture 450 may implement a feedback path via the output of the summation circuitry 528, the counter 536, the arbiter 540, and the FIFO buffer 538, which facilitates the transfer of the hard-computed (or the summed hard-computed terms in the case of the ganging implementations) back to the processing array 402 via the data routing circuitry 522. In any event, the hard-computed or the summed hard-computed terms, as the case may be, are fed back in this way to enable the hybrid architecture 450 to dynamically adjust the soft-computed modified terms output to the pipeline 532 and the sample interface 534 for transmission.

In this way, for both hybrid configurations 400, 450, the hardware accelerators 406 identified with each respective port work in a parallel with one another, thereby doubling the computational performance. Such implementations still use the DAC and antenna as shown in FIG. 5D for port 1 in this scenario. And because the summation circuitry 602 enables the combination of terms from two separate hardware accelerators 406, such implementations are particularly advantageous when the number of terms needs to be increased beyond what would otherwise be available via the use of a single hardware accelerator 406.

Device implementing a Hybrid Programmable Processing Array and Hardware Accelerator Architecture Again, the hybrid architectures 400, 450 may be implemented as part of or work in conjunction with a specialized component such as a radio transceiver that implements digital signal processing to perform various operations that may be utilized as part of wireless signal processing applications associated with wireless data communications. Thus, and with respect to the processing operations performed via the processing array portion and the hardware accelerator portion as discussed herein, these operations may be any suitable type of function that operates on the data samples. For the hardware accelerator portion, this may include the computation of any suitable number and/or type of terms using dedicated, predetermined hardware such as LUTs as noted above. The processing operations and computations performed on the data samples, as well as the number and/or type of terms computed in this manner, are a function of the particular application in which the hybrid architectures 400, 450 are utilized.

Again, such processing operations may include digital signal processing operations that are associated with wireless data communications, the application and/or calculation of finite impulse response (FIR) filter contributions to a digital data stream, equalizer functions, the calculation of digital pre-distortion (DPD) coefficients or terms, the application or calculation of Fast Fourier Transforms (FFTs) and/or digital Fourier Transforms (DFTs), matrix operations, mixer and/or frequency correction calculations, peak detection and/or cancellation calculations, signal measurements, average signal measurement calculations over time, digital signal processing of signals transmitted or received via individual antenna data streams for multiple-input-multiple-output (MIMO) antenna systems, etc. Furthermore, the data samples as discussed herein may be part of an in-phase (I) quadrature-phase (Q) data stream, which may be processed prior to data transmission of wireless signals or after receiving the wireless signals. Additionally or alternatively, such functions may be implemented as part of graphics processing unit (GPU) to perform graphics processing and/or rendering.

Figure 7:
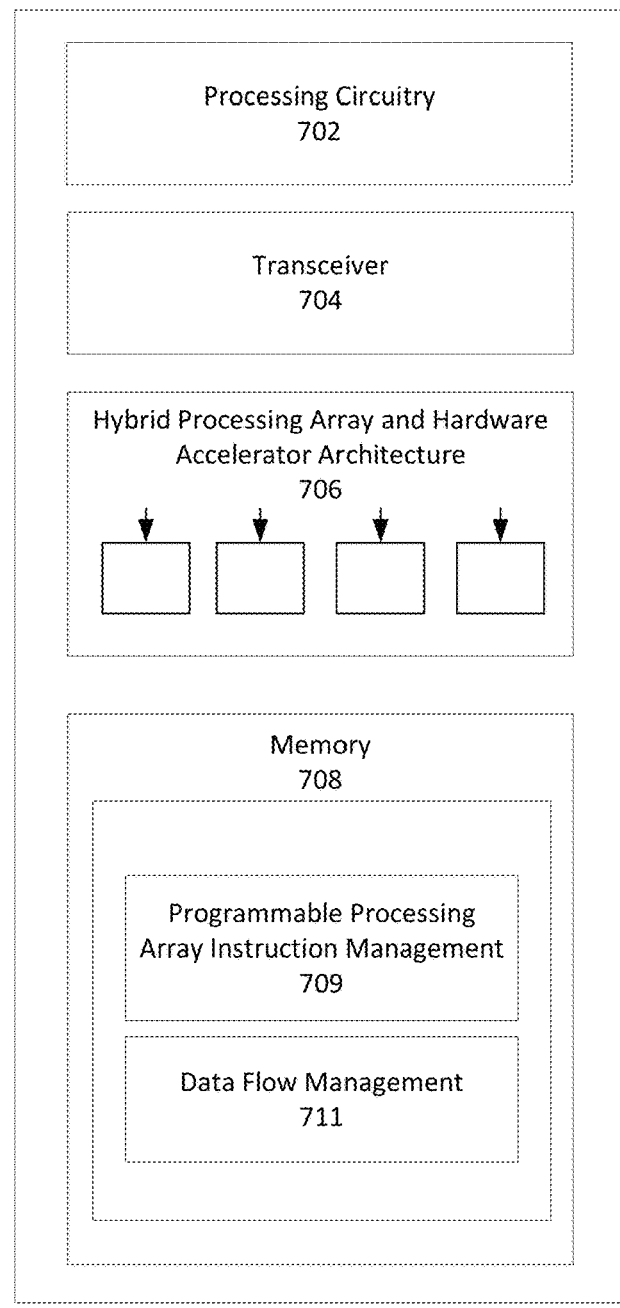
FIG. 7 illustrates an example device, in accordance with the disclosure.

FIG. 7 illustrates an example device, in accordance with the present disclosure. The device 700 may be identified with one or more devices implementing a hybrid programmable processing array and hardware accelerator architecture, such as the hybrid architectures 400, 450 as shown and discussed herein with reference to FIGS. 4A-4B. The device 700 may be identified with a wireless device, a user equipment (UE) or other suitable device configured to perform wireless communications such as a mobile phone, a laptop computer, a wireless communications base station, a tablet, etc., and which may include one or more components configured to transmit and receive radio signals and to use processing operations as discussed herein to perform digital signal processing operations in accordance with wirelessly transmitted and/or received data, which may include filter processing, DFE processing, etc. Alternatively, the device 700 may be identified with a graphics processing unit (GPU), which may perform graphic processing on streams of graphical data.

As further discussed below, the device 700 may perform the functions as discussed herein with respect to the hybrid programmable processing array and hardware accelerator architectures 400, 450 as shown and discussed with respect to FIGS. 4A and 4B. The device 700 may calculate soft and hard computed terms on arrays of data samples as discussed herein. To do so, the device 700 may include processing circuitry 702, a transceiver 704, a hybrid processing array and hardware accelerator architecture 706, and a memory 708. The components shown in FIG. 7 are provided for ease of explanation, and the device 700 may implement additional, less, or alternative components as those shown in FIG. 8. In one scenario, the transceiver 704 may be omitted when not necessary for a particular application.

The processing circuitry 702 may be configured as any suitable number and/or type of processing circuitry and/or computer processors, which may function to control the device 700 and/or other components of the device 700. The processing circuitry 702 may be identified with one or more processors (or suitable portions thereof) implemented by the device 700 or a host system that implements the hybrid processing array and hardware accelerator architecture 706. The processing circuitry 702 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 702 may be configured to carry out instructions to perform arithmetical, logical, and/or input/output (I/O) operations, and/or to control the operation of one or more components of device 700 to perform various functions as described herein. The processing circuitry 702 may include one or more microprocessor cores, memory registers, buffers, clocks, etc., and may generate electronic control signals associated with the components of the device 700 to control and/or modify the operation of these components. The processing circuitry 702 may communicate with and/or control functions associated with the transceiver 704, the hybrid processing array and hardware accelerator architecture 706, and/or the memory 708.

The transceiver 704 (when present) may be implemented as any suitable number and/or type of components configured to transmit and/or receive data (such as data packets) and/or wireless signals in accordance with any suitable number and/or type of communication protocols. The transceiver 704 may include any suitable type of components to facilitate this functionality, including components associated with known transceiver, transmitter, and/or receiver operation, configurations, and implementations. Although depicted in FIG. 7 as a transceiver, the transceiver 704 may include any suitable number of transmitters, receivers, or combinations of these that may be integrated into a single transceiver or as multiple transceivers or transceiver modules. The transceiver 704 may include components typically identified with an RF front end and include antennas, ports, power amplifiers (PAs), RF filters, mixers, local oscillators (LOs), low noise amplifiers (LNAs), upconverters, downconverters, channel tuners, etc. Thus, the transceiver 704 may be configured as any suitable number and/or type of components configured to facilitate receiving and/or transmitting data and/or signals in accordance with one or more communication protocols.

The transceiver 704 may be implemented as any suitable number and/or type of components to support wireless communications, and may be identified with the components as shown and discussed herein with reference to FIG. 5D. This may include analog-to-digital converters (ADCs), digital to analog converters (DACs), intermediate frequency (IF) amplifiers and/or filters, modulators, demodulators, baseband processors, one or more sample interfaces, one or more components otherwise known to be identified with RF front ends, such as DFEs, etc. The data received via the transceiver 704 (e.g. wireless signal data streams), data provided to the transceiver 704 for transmission (e.g. data streams for transmission), and/or data used in conjunction with the transmission and/or reception of data via the transceiver 704 (digital filter coefficients, DPD terms, etc.) may be processed as data streams via the hybrid processing array and hardware accelerator architecture 706, as discussed herein. Thus, the hybrid processing array and hardware accelerator architecture 706 may be identified with the hybrid architectures 400, 450 as shown and described herein with reference to FIGS. 4A-4B, which is shown in further detail in FIGS. 5A-5C.

The memory 708 stores data and/or instructions such that, when the instructions are executed by the processing circuitry 702, cause the device 700 to perform various functions as described herein with respect to the hybrid processing array and hardware accelerator architecture 706, such as controlling, monitoring, and/or regulating the flow of data through the hybrid processing array and hardware accelerator architecture 706. The memory 708 may be implemented as any well-known volatile and/or non-volatile memory, including read-only memory (ROM), random access memory (RAM), flash memory, a magnetic storage media, an optical disc, erasable programmable read only memory (EPROM), programmable read only memory (PROM), etc. The memory 708 may be non-removable, removable, or a combination of both. The memory 708 may be implemented as a non-transitory computer readable medium storing one or more executable instructions such as, for example, logic, algorithms, code, etc.

As further discussed below, the instructions, logic, code, etc., stored in the memory 708 are represented by the various modules as shown, which may enable the functionality disclosed herein to be functionally realized. Alternatively, the modules as shown in FIG. 7 that are associated with the memory 708 may include instructions and/or code to facilitate control and/or monitor the operation of hardware components implemented via the device 700. In other words, the modules shown in FIG. 7 are provided for ease of explanation regarding the functional association between hardware and software components. Thus, the processing circuitry 702 may execute the instructions stored in these respective modules in conjunction with one or more hardware components to perform the various functions as discussed herein.

The executable instructions stored in the programmable processing array instruction management module 709 may facilitate, in conjunction with execution via the processing circuitry 702, the device 700 receiving and decoding processor instructions (which may be sent via the processing circuitry 702 or other suitable component of the device 700 or a component external to the device 700), and providing arrays of data samples to the PEs within the processing array portion of the hybrid processing array and hardware accelerator architecture 706 (such as via the data interface 502 as discussed herein). The functionality provided by the programmable processing array instruction management module 709 is a function of the particular implementation and/or type of processing array implemented via the device 700.

Thus, if a vector processor is implemented, then the programmable processing array instruction management module 709 may facilitate the determination of each specific vector processor instruction to perform specific types of vector processing operations and/or any of the functionality with respect to a vector processor architecture such as the retrieval of vector data samples from vector registers, performing vector processing operations and/or computations, providing the results of vector processing operations to the hardware accelerator portion of the hybrid processing array and hardware accelerator architecture 706, etc. Of course, in the event that the device 700 implements an FPGA, DSP, or other suitable type of processing array architecture, then the programmable processing array instruction management module 709 may function to translate and/or decode instructions to identify the type of processing operations and/or calculations to perform on arrays of data samples in an analogous manner as the use of a vector processor.

The executable instructions stored in the data flow management module 711 may facilitate, in conjunction with execution via the processing circuitry 702, the routing of data samples within the hybrid processing array and hardware accelerator architecture 706. This may include routing soft and/or hard computed terms as noted herein. With reference to FIGS. 5A-5D, this may include routing data from the data interface 502 to one or more PEs of the processing array 402 of the hybrid processing array and hardware accelerator architecture 706. This may additionally include routing arrays of data samples after processing operations have been performed via the PEs of the processing array 402 to the hardware accelerator 406 of the hybrid processing array and hardware accelerator architecture 706. Thus, the executable instructions stored in the data flow management module 711 may facilitate routing data samples from the processing array 402 to the hardware accelerator 406 via the data interface 404 as shown and discussed herein with reference to FIGS. 5A-5D. This may include the control of the select lines of the muxes 526A, 530A, the synchronization of data samples via the synchronization circuitry 544A, the storage of data samples in the corresponding address within the memory 524A, etc. This may further include routing data from the hardware accelerator 406 back to the processing array 402 via the data interface 404, which again may include the use of counters 540A, 542A to identify the corresponding location of data in the FIFO 538 and the particular PEs of the processing array 402 to access the results of the data samples stored in the FIFO 538 as noted herein. This may also include routing the RX data from the sample interface 534A to the processing array 402 as noted above.

General Operation of a Hybrid Processing Array and Hardware Accelerator Architecture A system on a chip (SoC) is provided. With reference to FIGS. 4A-4B, the SoC includes an array of processing elements, each one of the processing elements being configured to perform processing operations on an array of data samples; a hardware accelerator; and a data interface coupled to the array of processing elements and to the hardware accelerator, the data interface being configured to transfer the array of data samples from the array of processing elements to the hardware accelerator, wherein the hardware accelerator is configured to compute terms in accordance with a predetermined processing function to generate processed data samples including a set of computed terms based on the transferred array of data samples. The array of processing elements comprise a vector processor, and the processing elements comprise execution units of the vector processor. In addition or in alternative to and in any combination with the optional features previously explained in this paragraph, the hardware accelerator is configured to compute the set of terms in accordance with the predetermined processing function by summing non-linear terms computed using the array of data samples transferred via the data interface. In addition or in alternative to and in any combination with the optional features previously explained in this paragraph, the hardware accelerator is configured to compute the set of terms in accordance with the predetermined processing function by summing non-linear terms that are evaluated in accordance with a polynomial function. In addition or in alternative to and in any combination with the optional features previously explained in this paragraph, the hardware accelerator comprises a set of lookup tables (LUTs) that contain data entries corresponding to the set of computed terms, and is configured to compute the set of terms in accordance with the predetermined processing function by correlating the array of data samples transferred via the data interface to the LUT entries. In addition or in alternative to and in any combination with the optional features previously explained in this paragraph, one of the processing elements in the array of processing elements is configured to perform processing operations on an array of data samples to generate an array of processed data samples including a set of additional computed terms, the data interface is configured to synchronize the set of additional computed terms computed via the one of the processing elements with the set of computed terms computed via the hardware accelerator, and the hardware accelerator further comprises summation circuitry configured to add the set of additional computed terms with the set of computed terms such that the processed data samples include the set of computed terms and the set of additional computed terms. In addition or in alternative to and in any combination with the optional features previously explained in this paragraph, the data interface is configured to transfer the processed data samples including the set of computed terms to one of the of the processing elements as a first array of data samples; one of the processing elements in the array of processing elements is configured to perform processing operations on the first array of data samples to generate a second array of data samples including a set of modified computed terms, and the hardware accelerator is configured to output further processed data samples including a set of modified computed terms based upon the second array of data samples. In addition or in alternative to and in any combination with the optional features previously explained in this paragraph, the predetermined processing function comprises a digital predistortion (DPD) function, and the hardware accelerator is configured to compute, as the terms in accordance with the DPD function, DPD coefficients used for a wireless data transmission. In addition or in alternative to and in any combination with the optional features previously explained in this paragraph, the data interface comprises a data buffer and routing circuitry, and the routing circuitry is configured to transfer the array of data samples from array of processing elements to the hardware accelerator by writing the array of data samples to a predetermined range of addresses in the buffer based upon which one of the processing elements from which the array of data samples were transferred to the data interface. In addition or in alternative to and in any combination with the optional features previously explained in this paragraph, the hardware accelerator is a first hardware accelerator from among a plurality of hardware accelerators that further include a second hardware accelerator, the first hardware accelerator being associated with a first port, and the second hardware accelerator being associated with a second port, each of the first and the second hardware accelerator is configured to compute a respective set of terms in accordance with a predetermined processing function using the array of data samples transferred via the data interface, and the processed data samples including the set of computed terms represent a summation of the respective set of terms computed via the first and the second hardware accelerator.

General Configuration of a Wireless Device

A wireless device is provided. With reference to FIG. 7, the wireless device includes an array of processing elements, each one of the processing elements being configured to perform processing operations on an array of data samples; a hardware accelerator; and a data interface coupled to the array of processing elements and to the hardware accelerator, the data interface being configured to transfer the array of data samples from the array of processing elements to the hardware accelerator, wherein the hardware accelerator is configured to compute terms in accordance with a predetermined processing function to generate processed data samples including a set of computed terms based on the transferred array of data samples. The array of processing elements comprise a vector processor, and the processing elements comprise execution units of the vector processor. In addition or in alternative to and in any combination with the optional features previously explained in this paragraph, the hardware accelerator is configured to compute the set of terms in accordance with the predetermined processing function by summing non-linear terms computed using the array of data samples transferred via the data interface. In addition or in alternative to and in any combination with the optional features previously explained in this paragraph, the hardware accelerator is configured to compute the set of terms in accordance with the predetermined processing function by summing non-linear terms that are evaluated in accordance with a polynomial function. In addition or in alternative to and in any combination with the optional features previously explained in this paragraph, the hardware accelerator comprises a set of lookup tables (LUTs) that contain data entries corresponding to the set of computed terms, and the hardware accelerator is configured to compute the set of terms in accordance with the predetermined processing function by correlating the array of data samples transferred via the data interface to the LUT entries. In addition or in alternative to and in any combination with the optional features previously explained in this paragraph, one of the processing elements in the array of processing elements is configured to perform processing operations on an array of data samples to generate an array of processed data samples including a set of additional computed terms, the data interface is configured to synchronize the set of additional computed terms computed via the one of the processing elements with the set of computed terms computed via the hardware accelerator, and the hardware accelerator further comprises summation circuitry configured to add the set of additional computed terms with the set of computed terms such that the processed data samples include the set of computed terms and the set of additional computed terms. In addition or in alternative to and in any combination with the optional features previously explained in this paragraph, the data interface is configured to transfer the processed data samples including the set of computed terms to one of the of the processing elements as a first array of data samples; one of the processing elements in the array of processing elements is configured to perform processing operations on the first array of data samples to generate a second array of data samples including a set of modified computed terms, and the hardware accelerator is configured to output further processed data samples including a set of modified computed terms based upon the second array of data samples. In addition or in alternative to and in any combination with the optional features previously explained in this paragraph, the predetermined processing function comprises a digital pre-distortion (DPD) function, and the hardware accelerator is configured to compute, as the terms in accordance with the DPD function, DPD coefficients used for a wireless data transmission. In addition or in alternative to and in any combination with the optional features previously explained in this paragraph, the data interface comprises a data buffer and routing circuitry, and the routing circuitry is configured to transfer the array of data samples from array of processing elements to the hardware accelerator by writing the array of data samples to a predetermined range of addresses in the buffer based upon which one of the processing elements from which the array of data samples were transferred to the data interface. In addition or in alternative to and in any combination with the optional features previously explained in this paragraph, the hardware accelerator is a first hardware accelerator from among a plurality of hardware accelerators that further include a second hardware accelerator, the first hardware accelerator being associated with a first port, and the second hardware accelerator being associated with a second port, each of the first and the second hardware accelerator is configured to compute a respective set of terms in accordance with a predetermined processing function using the array of data samples transferred via the data interface, and the processed data samples including the set of computed terms represent a summation of the respective set of terms computed via the first and the second hardware accelerator.

Process Flow

Figure 8:
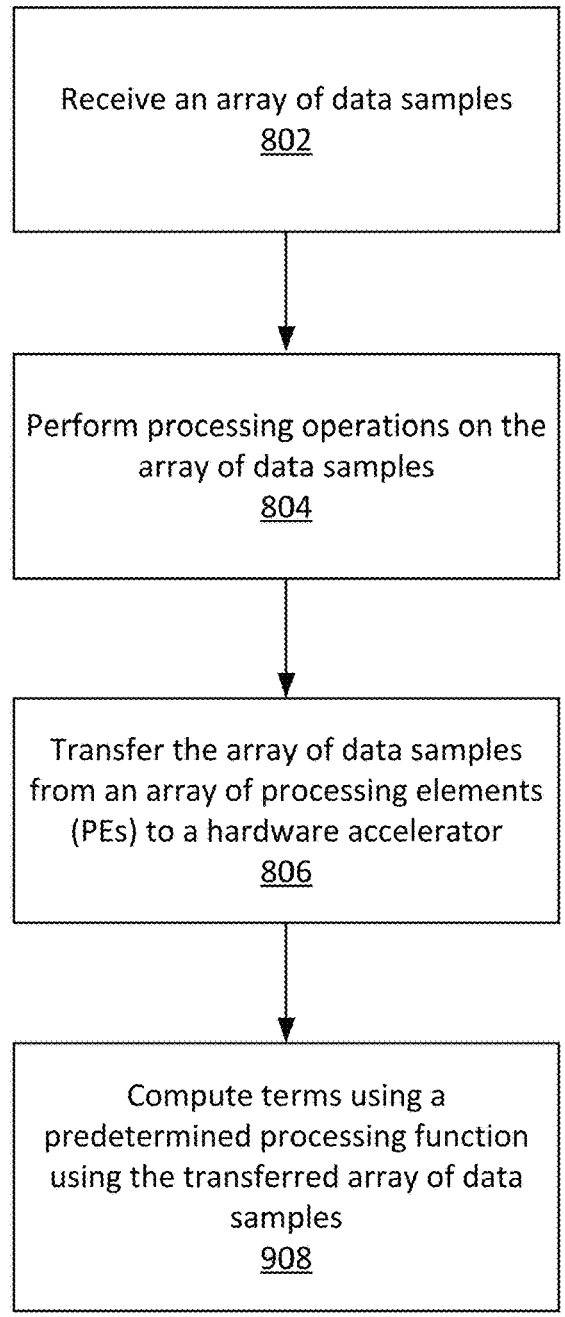
FIG. 8 illustrates a process flow, in accordance with the disclosure.

FIG. 8 illustrates a process flow. With reference to FIG. 8, the process flow 800 may be a computer-implemented method executed by and/or otherwise associated with one or more processors (processing circuitry) and/or storage devices. These processors and/or storage devices may be associated with one or more components of the hybrid architectures 400, 450 as discussed herein and/or one or more components of the device 700 as discussed herein. The processors and/or storage devices may be identified with the one or more PEs of the processing array 402, processing circuitry identified with the hardware accelerator 706, and/or the processing circuitry 702. The flow 800 may include alternate or additional steps that are not shown in FIG. 8 for purposes of brevity, and may be performed in a different order than the steps shown in FIG. 8.

Flow 800 may begin when one or more processors receive (block 802) an array of data samples. These data samples may be provided via the data interface 502 as discussed above with reference to FIGS. 5A-5D, and include any suitable number of data samples as discussed herein.

Flow 800 may include one or more processors, in response to receiving the array of data samples, performing (block 804) processing operations on the array of data samples. These processing operations may be executed via the PEs of the processing array 402 as noted above in accordance with specific instructions such as an instruction set. The processing operations may include reordering, reformatting, reorganizing, and/or modifying the array of data samples, as noted herein.

Flow 800 may include one or more processors transferring (block 806) the array of data samples after the processing operations have been performed from the array of PEs of the processing array 402 to the hardware accelerator. This may include the use of the data interface 404 to write the data samples, once processed, to the corresponding address of a buffer identified with the memory 524A, as noted above.

Flow 800 may include one or more processors computing (block 808) terms using a predetermined processing function using the transferred array of data samples. This may include the hardware accelerator 406 correlating the array of processed data samples to LUT entries as noted herein to provide hard-computed terms, and performing multiplication and summing as noted herein. Again, depending upon the particular architecture and data flow application that is implemented, the hard-computed terms may be combined with soft-computed terms computed via the processing array 402 and/or fed back to the processing array 402 for the computation of additional or modified terms, as noted herein.

Examples

The following examples pertain to various techniques of the present disclosure.

An example (e.g. example 1) relates to a system on a chip (SoC). The SoC includes an array of processing elements, each one of the processing elements being configured to perform processing operations on an array of data samples; a hardware accelerator; and a data interface coupled to the array of processing elements and to the hardware accelerator, the data interface being configured to transfer the array of data samples from the array of processing elements to the hardware accelerator, wherein the hardware accelerator is configured to compute terms in accordance with a predetermined processing function to generate processed data samples including a set of computed terms based on the transferred array of data samples.

Another example (e.g. example 2) relates to a previously-described example (e.g. example 1), wherein the array of processing elements comprises a vector processor, and wherein the processing elements comprise execution units of the vector processor.

Another example (e.g. example 3) relates to a previously-described example (e.g. one or more of examples 1-2), wherein hardware accelerator is configured to compute the set of terms in accordance with the predetermined processing function by summing non-linear terms computed using the array of data samples transferred via the data interface.

Another example (e.g. example 4) relates to a previously-described example (e.g. one or more of examples 1-3), wherein the hardware accelerator is configured to compute the set of terms in accordance with the predetermined processing function by summing non-linear terms that are evaluated in accordance with a polynomial function.

Another example (e.g. example 5) relates to a previously-described example (e.g. one or more of examples 1-4), wherein the hardware accelerator comprises a set of lookup tables (LUTs) that contain data entries corresponding to the set of computed terms, and wherein hardware accelerator is configured to compute the set of terms in accordance with the predetermined processing function by correlating the array of data samples transferred via the data interface to the LUT entries.

Another example (e.g. example 6) relates to a previously-described example (e.g. one or more of examples 1-5), wherein: one of the processing elements in the array of processing elements is configured to perform processing operations on an array of data samples to generate an array of processed data samples including a set of additional computed terms, the data interface is configured to synchronize the set of additional computed terms computed via the one of the processing elements with the set of computed terms computed via the hardware accelerator, and the hardware accelerator further comprises summation circuitry configured to add the set of additional computed terms with the set of computed terms such that the processed data samples include the set of computed terms and the set of additional computed terms.

Another example (e.g. example 7) relates to a previously-described example (e.g. one or more of examples 1-6), wherein: the data interface is configured to transfer the processed data samples including the set of computed terms to one of the of the processing elements as a first array of data samples; one of the processing elements in the array of processing elements is configured to perform processing operations on the first array of data samples to generate a second array of data samples including a set of modified computed terms, and the hardware accelerator is configured to output further processed data samples including a set of modified computed terms based upon the second array of data samples.

Another example (e.g. example 8) relates to a previously-described example (e.g. one or more of examples 1-7), wherein the predetermined processing function comprises a digital pre-distortion (DPD) function, and wherein the hardware accelerator is configured to compute, as the terms in accordance with the DPD function, DPD coefficients used for a wireless data transmission.

Another example (e.g. example 9) relates to a previously-described example (e.g. one or more of examples 1-8), wherein the data interface comprises a data buffer and routing circuitry, and wherein the routing circuitry is configured to transfer the array of data samples from array of processing elements to the hardware accelerator by writing the array of data samples to a predetermined range of addresses in the buffer based upon which one of the processing elements from which the array of data samples were transferred to the data interface.

Another example (e.g. example 10) relates to a previously-described example (e.g. one or more of examples 1-9), wherein: the hardware accelerator is a first hardware accelerator from among a plurality of hardware accelerators that further include a second hardware accelerator, the first hardware accelerator being associated with a first port, and the second hardware accelerator being associated with a second port, each of the first and the second hardware accelerator is configured to compute a respective set of terms in accordance with a predetermined processing function using the array of data samples transferred via the data interface, and the processed data samples including the set of computed terms represent a summation of the respective set of terms computed via the first and the second hardware accelerator.

An example (e.g. example 11) relates to a wireless device. The wireless device includes an array of processing elements, each one of the processing elements being configured to perform processing operations on an array of data samples; a hardware accelerator; and a data interface coupled to the array of processing elements and to the hardware accelerator, the data interface being configured to transfer the array of data samples from the array of processing elements to the hardware accelerator, wherein the hardware accelerator is configured to compute terms in accordance with a predetermined processing function to generate processed data samples including a set of computed terms based on the transferred array of data samples.

Another example (e.g. example 12) relates to a previously-described example (e.g. example 11), wherein the array of processing elements comprises a vector processor, and wherein the processing elements comprise execution units of the vector processor.

Another example (e.g. example 13) relates to a previously-described example (e.g. one or more of examples 11-12), wherein hardware accelerator is configured to compute the set of terms in accordance with the predetermined processing function by summing non-linear terms computed using the array of data samples transferred via the data interface.

Another example (e.g. example 14) relates to a previously-described example (e.g. one or more of examples 11-13), wherein the hardware accelerator is configured to compute the set of terms in accordance with the predetermined processing function by summing non-linear terms that are evaluated in accordance with a polynomial function.

Another example (e.g. example 15) relates to a previously-described example (e.g. one or more of examples 11-14), wherein the hardware accelerator comprises a set of lookup tables (LUTs) that contain data entries corresponding to the set of computed terms, and wherein hardware accelerator is configured to compute the set of terms in accordance with the predetermined processing function by correlating the array of data samples transferred via the data interface to the LUT entries.

Another example (e.g. example 16) relates to a previously-described example (e.g. one or more of examples 11-15), wherein: one of the processing elements in the array of processing elements is configured to perform processing operations on an array of data samples to generate an array of processed data samples including a set of additional computed terms, the data interface is configured to synchronize the set of additional computed terms computed via the one of the processing elements with the set of computed terms computed via the hardware accelerator, and the hardware accelerator further comprises summation circuitry configured to add the set of additional computed terms with the set of computed terms such that the processed data samples include the set of computed terms and the set of additional computed terms.

Another example (e.g. example 17) relates to a previously-described example (e.g. one or more of examples 11-16), wherein: the data interface is configured to transfer the processed data samples including the set of computed terms to one of the of the processing elements as a first array of data samples; one of the processing elements in the array of processing elements is configured to perform processing operations on the first array of data samples to generate a second array of data samples including a set of modified computed terms, and the hardware accelerator is configured to output further processed data samples including a set of modified computed terms based upon the second array of data samples.

Another example (e.g. example 18) relates to a previously-described example (e.g. one or more of examples 11-17), wherein the predetermined processing function comprises a digital pre-distortion (DPD) function, and wherein the hardware accelerator is configured to compute, as the terms in accordance with the DPD function, DPD coefficients used for a wireless data transmission.

Another example (e.g. example 19) relates to a previously-described example (e.g. one or more of examples 11-18), wherein the data interface comprises a data buffer and routing circuitry, and wherein the routing circuitry is configured to transfer the array of data samples from array of processing elements to the hardware accelerator by writing the array of data samples to a predetermined range of addresses in the buffer based upon which one of the processing elements from which the array of data samples were transferred to the data interface.

Another example (e.g. example 20) relates to a previously-described example (e.g. one or more of examples 11-19), wherein: the hardware accelerator is a first hardware accelerator from among a plurality of hardware accelerators that further include a second hardware accelerator, the first hardware accelerator being associated with a first port, and the second hardware accelerator being associated with a second port, each of the first and the second hardware accelerator is configured to compute a respective set of terms in accordance with a predetermined processing function using the array of data samples transferred via the data interface, and the processed data samples including the set of computed terms represent a summation of the respective set of terms computed via the first and the second hardware accelerator.

An example (e.g. example 21) relates to a system on a chip (SoC). The SoC includes an array of processing means, each one of the processing means being configured to perform processing operations on an array of data samples; a hardware accelerator; and a data interface coupled to the array of processing means and to the hardware accelerator, the data interface being configured to transfer the array of data samples from the array of processing means to the hardware accelerator, wherein the hardware accelerator is configured to compute terms in accordance with a predetermined processing function to generate processed data samples including a set of computed terms based on the transferred array of data samples.

Another example (e.g. example 22) relates to a previously-described example (e.g. example 21), wherein the array of processing means comprises a vector processor, and wherein the processing means comprise execution units of the vector processor.

Another example (e.g. example 23) relates to a previously-described example (e.g. one or more of examples 21-22), wherein hardware accelerator is configured to compute the set of terms in accordance with the predetermined processing function by summing non-linear terms computed using the array of data samples transferred via the data interface.

Another example (e.g. example 24) relates to a previously-described example (e.g. one or more of examples 21-23), wherein the hardware accelerator is configured to compute the set of terms in accordance with the predetermined processing function by summing non-linear terms that are evaluated in accordance with a polynomial function.

Another example (e.g. example 25) relates to a previously-described example (e.g. one or more of examples 21-24), wherein the hardware accelerator comprises a set of lookup tables (LUTs) that contain data entries corresponding to the set of computed terms, and wherein hardware accelerator is configured to compute the set of terms in accordance with the predetermined processing function by correlating the array of data samples transferred via the data interface to the LUT entries.

Another example (e.g. example 26) relates to a previously-described example (e.g. one or more of examples 21-25), wherein: one of the processing means in the array of processing means is configured to perform processing operations on an array of data samples to generate an array of processed data samples including a set of additional computed terms, the data interface is configured to synchronize the set of additional computed terms computed via the one of the processing elements with the set of computed terms computed via the hardware accelerator, and the hardware accelerator further comprises summation circuitry configured to add the set of additional computed terms with the set of computed terms such that the processed data samples include the set of computed terms and the set of additional computed terms.

Another example (e.g. example 27) relates to a previously-described example (e.g. one or more of examples 21-26), wherein: the data interface is configured to transfer the processed data samples including the set of computed terms to one of the of the processing means as a first array of data samples; one of the processing means in the array of processing means is configured to perform processing operations on the first array of data samples to generate a second array of data samples including a set of modified computed terms, and the hardware accelerator is configured to output further processed data samples including a set of modified computed terms based upon the second array of data samples.

Another example (e.g. example 28) relates to a previously-described example (e.g. one or more of examples 21-27), wherein the predetermined processing function comprises a digital pre-distortion (DPD) function, and wherein the hardware accelerator is configured to compute, as the terms in accordance with the DPD function, DPD coefficients used for a wireless data transmission.

Another example (e.g. example 29) relates to a previously-described example (e.g. one or more of examples 21-28), wherein the data interface comprises a data buffer and routing circuitry, and wherein the routing circuitry is configured to transfer the array of data samples from array of processing elements to the hardware accelerator by writing the array of data samples to a predetermined range of addresses in the buffer based upon which one of the processing elements from which the array of data samples were transferred to the data interface.

Another example (e.g. example 30) relates to a previously-described example (e.g. one or more of examples 21-29), wherein: the hardware accelerator is a first hardware accelerator from among a plurality of hardware accelerators that further include a second hardware accelerator, the first hardware accelerator being associated with a first port, and the second hardware accelerator being associated with a second port, each of the first and the second hardware accelerator is configured to compute a respective set of terms in accordance with a predetermined processing function using the array of data samples transferred via the data interface, and the processed data samples including the set of computed terms represent a summation of the respective set of terms computed via the first and the second hardware accelerator.

An example (e.g. example 31) relates to a wireless device. The wireless device includes an array of processing means, each one of the processing means being configured to perform processing operations on an array of data samples; a hardware accelerator; and a data interface coupled to the array of processing means and to the hardware accelerator, the data interface being configured to transfer the array of data samples from the array of processing means to the hardware accelerator, wherein the hardware accelerator is configured to compute terms in accordance with a predetermined processing function to generate processed data samples including a set of computed terms based on the transferred array of data samples.

Another example (e.g. example 32) relates to a previously-described example (e.g. example 31), wherein the array of processing means comprises a vector processor, and wherein the processing elements comprise execution units of the vector processor.

Another example (e.g. example 33) relates to a previously-described example (e.g. one or more of examples 31-32), wherein hardware accelerator is configured to compute the set of terms in accordance with the predetermined processing function by summing non-linear terms computed using the array of data samples transferred via the data interface.

Another example (e.g. example 34) relates to a previously-described example (e.g. one or more of examples 31-33), wherein the hardware accelerator is configured to compute the set of terms in accordance with the predetermined processing function by summing non-linear terms that are evaluated in accordance with a polynomial function.

Another example (e.g. example 35) relates to a previously-described example (e.g. one or more of examples 31-34), wherein the hardware accelerator comprises a set of lookup tables (LUTs) that contain data entries corresponding to the set of computed terms, and wherein hardware accelerator is configured to compute the set of terms in accordance with the predetermined processing function by correlating the array of data samples transferred via the data interface to the LUT entries.

Another example (e.g. example 36) relates to a previously-described example (e.g. one or more of examples 31-35), wherein: one of the processing means in the array of processing means is configured to perform processing operations on an array of data samples to generate an array of processed data samples including a set of additional computed terms, the data interface is configured to synchronize the set of additional computed terms computed via the one of the processing elements with the set of computed terms computed via the hardware accelerator, and the hardware accelerator further comprises summation circuitry configured to add the set of additional computed terms with the set of computed terms such that the processed data samples include the set of computed terms and the set of additional computed terms.

Another example (e.g. example 37) relates to a previously-described example (e.g. one or more of examples 31-36), wherein: the data interface is configured to transfer the processed data samples including the set of computed terms to one of the of the processing elements as a first array of data samples; one of the processing means in the array of processing means is configured to perform processing operations on the first array of data samples to generate a second array of data samples including a set of modified computed terms, and the hardware accelerator is configured to output further processed data samples including a set of modified computed terms based upon the second array of data samples.

Another example (e.g. example 38) relates to a previously-described example (e.g. one or more of examples 31-37), wherein the predetermined processing function comprises a digital pre-distortion (DPD) function, and wherein the hardware accelerator is configured to compute, as the terms in accordance with the DPD function, DPD coefficients used for a wireless data transmission.

Another example (e.g. example 39) relates to a previously-described example (e.g. one or more of examples 31-38), wherein the data interface comprises a data buffer and routing circuitry, and wherein the routing circuitry is configured to transfer the array of data samples from array of processing means to the hardware accelerator by writing the array of data samples to a predetermined range of addresses in the buffer based upon which one of the processing means from which the array of data samples were transferred to the data interface.

Another example (e.g. example 40) relates to a previously-described example (e.g. one or more of examples 31-39), wherein: the hardware accelerator is a first hardware accelerator from among a plurality of hardware accelerators that further include a second hardware accelerator, the first hardware accelerator being associated with a first port, and the second hardware accelerator being associated with a second port, each of the first and the second hardware accelerator is configured to compute a respective set of terms in accordance with a predetermined processing function using the array of data samples transferred via the data interface, and the processed data samples including the set of computed terms represent a summation of the respective set of terms computed via the first and the second hardware accelerator.

An apparatus as shown and described.

A method as shown and described.

CONCLUSION

The aforementioned description will so fully reveal the general nature of the disclosure that others can, by applying knowledge within the skill of the art, readily modify and/or adapt for various applications without undue experimentation, and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one implementation," "an implementation," "an exemplary implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The implementation described herein are provided for illustrative purposes, and are not limiting. Other implementation are possible, and modifications may be made to the described implementations. Therefore, the specification is not meant to limit the disclosure. Rather, the scope of the disclosure is defined only in accordance with the following claims and their equivalents.

The implementations described herein may be facilitated in hardware (e.g., circuits), firmware, software, or any combination thereof. Implementations may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to implementations described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the implementations described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A system on a chip (SoC), comprising:
an array of processing elements, each one of the processing elements being configured to perform processing operations on an array of data samples;
a hardware accelerator; and
a data interface comprising a buffer, the data interface being coupled to the array of processing elements and to the hardware accelerator,
wherein the data interface is configured to transfer the array of data samples from the array of processing elements to the hardware accelerator by storing the array of data samples at an address location in the buffer based upon a respective one of the processing elements from which the array of data samples was received, and
wherein the hardware accelerator is configured to compute, based upon the transferred array of data samples, a set of computed terms in accordance with a predetermined processing function to generate processed data samples including the set of computed terms.

2. The SoC of claim 1, wherein the array of processing elements comprises a vector processor, and
wherein the processing elements comprise execution units of the vector processor.

3. The SoC of claim 1, wherein the hardware accelerator is configured to compute the set of computed terms in accordance with the predetermined processing function by summing non-linear terms computed based upon the transferred array of data samples.

4. The SoC of claim 3, wherein the hardware accelerator is configured to compute the set of computed terms in accordance with the predetermined processing function by summing the non-linear terms, which are evaluated in accordance with a polynomial function.

5. The SoC of claim 1, wherein the hardware accelerator comprises a set of lookup tables (LUTs) that contain data entries corresponding to the set of computed terms, and
   wherein hardware accelerator is configured to compute the set of computed terms in accordance with the predetermined processing function by correlating the array of data samples transferred via the data interface to the LUT data entries.

6. The SoC of claim 1, wherein:
   one of the processing elements in the array of processing elements is configured to perform processing operations on the array of data samples to generate an array of processed data samples including a set of additional computed terms,
   the data interface is configured to synchronize the set of additional computed terms with the set of computed terms, and
   the hardware accelerator further comprises summation circuitry configured to add the set of additional computed terms with the set of computed terms such that the processed data samples include the set of computed terms and the set of additional computed terms.

7. The SoC of claim 1, wherein:
   the data interface is configured to transfer the processed data samples including the set of computed terms to one of the processing elements as a first array of data samples,
   the one of the processing elements in the array of processing elements is configured to perform processing operations on the first array of data samples to generate a second array of data samples including a set of modified computed terms, and
   the hardware accelerator is configured to output further processed data samples including the set of modified computed terms based upon the second array of data samples.

8. The SoC of claim 1, wherein the predetermined processing function comprises a digital pre-distortion (DPD) function, and
   wherein the hardware accelerator is configured to compute, as the terms in accordance with the DPD function, DPD coefficients for a wireless data transmission.

9. The SoC of claim 1, wherein the data interface further comprises routing circuitry, and
   wherein the routing circuitry is configured to transfer the array of data samples from the array of processing elements to the hardware accelerator by writing the array of data samples to a predetermined range of addresses in the buffer based upon the respective one of the array of processing elements from which the array of data samples were received.

10. The SoC of claim 1, wherein:
    the hardware accelerator is a first hardware accelerator from among a plurality of hardware accelerators comprising a second hardware accelerator, the first hardware accelerator being associated with a first port, and the second hardware accelerator being associated with a second port,
    each of the first and the second hardware accelerator is configured to compute a respective set of computed terms in accordance with a predetermined processing function based upon a respective array of data samples transferred via the data interface, and
    the processed data samples including the set of computed terms represent a summation of each respective set of computed terms computed via the first and the second hardware accelerator.

11. A wireless device, comprising:
    an array of processing elements, each one of the processing elements being configured to perform processing operations on an array of data samples;
    a hardware accelerator; and
    a data interface comprising a buffer, the data interface being coupled to the array of processing elements and to the hardware accelerator,
    wherein the data interface is configured to transfer the array of data samples from the array of processing elements to the hardware accelerator by storing the array of data samples at an address location in the buffer based upon a respective one of the processing elements from which the array of data samples was received, and
    wherein the hardware accelerator is configured to compute, based upon the transferred array of data samples, a set of computed terms in accordance with a predetermined processing function to generate processed data samples including the set of computed terms.

12. The wireless device of claim 11, wherein the array of processing elements comprises a vector processor, and
    wherein the processing elements comprise execution units of the vector processor.

13. The wireless device of claim 11, wherein the hardware accelerator is configured to compute the set of computed terms in accordance with the predetermined processing function by summing non-linear terms computed using-based upon the transferred array of data samples.

14. The wireless device of claim 13, wherein the hardware accelerator is configured to compute the set of computed terms in accordance with the predetermined processing function by summing the non-linear terms, which are evaluated in accordance with a polynomial function.

15. The wireless device of claim 11, wherein the hardware accelerator comprises a set of lookup tables (LUTs) that contain data entries corresponding to the set of computed terms, and
    wherein hardware accelerator is configured to compute the set of computed terms in accordance with the predetermined processing function by correlating the array of data samples transferred via the data interface to the LUT data entries.

16. The wireless device of claim 11, wherein:
    one of the processing elements in the array of processing elements is configured to perform processing operations on the array of data samples to generate an array of processed data samples including a set of additional computed terms,
    the data interface is configured to synchronize the set of additional computed terms with the set of computed terms, and
    the hardware accelerator further comprises summation circuitry configured to add the set of additional computed terms with the set of computed terms such that the processed data samples include the set of computed terms and the set of additional computed terms.

17. The wireless device of claim 11, wherein:
    the data interface is configured to transfer the processed data samples including the set of computed terms to one of the processing elements as a first array of data samples, the one of the processing elements in the array of processing elements is configured to perform processing operations on the first array of data samples to generate a second array of data samples including a set of modified computed terms, and the hardware accelerator is configured to output further processed data samples including the set of modified computed terms based upon the second array of data samples.

18. The wireless device of claim 11, wherein the predetermined processing function comprises a digital pre-distortion (DPD) function, and wherein the hardware accelerator is configured to compute, as the terms in accordance with the DPD function, DPD coefficients for a wireless data transmission.

19. The wireless device of claim 11, wherein the data interface further comprises routing circuitry, and wherein the routing circuitry is configured to transfer the array of data samples from the array of processing elements to the hardware accelerator by writing the array of data samples to a predetermined range of addresses in the buffer based upon the respective one of the processing elements from which the array of data samples were received.

20. The wireless device of claim 11, wherein:

the hardware accelerator is a first hardware accelerator from among a plurality of hardware accelerators comprising a second hardware accelerator, the first hardware accelerator being associated with a first port, and the second hardware accelerator being associated with a second port, each of the first and the second hardware accelerator is configured to compute a respective set of computed terms in accordance with a predetermined processing function based upon a respective array of data samples transferred via the data interface, and the processed data samples including the set of computed terms represent a summation of each respective set of computed terms computed via the first and the second hardware accelerator.

21. The SoC of claim 1, wherein the data interface is configured to transfer the processed data samples including the set of computed terms to one of the processing elements as a first array of data samples, and wherein the hardware accelerator is configured to output further processed data samples including a set of modified computed terms based upon the first array of data samples and a second array of data samples that are generated based upon the first array of data samples.

* * * * *